US012803721B2

(12) United States Patent
Chen et al.

(10) Patent No.: US 12,803,721 B2
(45) Date of Patent: Nov. 17, 2026

(54) FEEDBACK METHOD, COMMUNICATION NODE AND STORAGE MEDIUM

(71) Applicant: ZTE CORPORATION, Shenzhen (CN)

(72) Inventors: Jie Chen, Shenzhen (CN); Youxiong Lu, Shenzhen (CN); Weimin Xing, Shenzhen (CN); Haigang He, Shenzhen (CN); Junpeng Lou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 278 days.

(21) Appl. No.: 18/699,451

(22) PCT Filed: Sep. 29, 2022

(86) PCT No.: PCT/CN2022/122472
§ 371 (c)(1),
(2) Date: Apr. 8, 2024

(87) PCT Pub. No.: WO2023/056880
PCT Pub. Date: Apr. 13, 2023

(65) Prior Publication Data
US 2024/0413935 A1 Dec. 12, 2024

(30) Foreign Application Priority Data
Oct. 8, 2021 (CN) .......................... 202111172739.7

(51) Int. Cl.
*H04L 1/1829* (2023.01)
*H04L 1/1812* (2023.01)
*H04L 5/00* (2006.01)

(52) U.S. Cl.
CPC .......... *H04L 1/1864* (2013.01); *H04L 1/1812* (2013.01); *H04L 5/0055* (2013.01)

(58) Field of Classification Search
CPC ................. H04L 1/1864; H04L 1/1812; H04L 5/0055; H04L 2001/0092; H04L 1/1854;
(Continued)

(56) References Cited

U.S. PATENT DOCUMENTS

2013/0301433 A1* 11/2013 Yin ....................... H04L 5/0055 370/252
2020/0145167 A1* 5/2020 Jung ..................... H04L 1/1861
(Continued)

FOREIGN PATENT DOCUMENTS

WO WO 2021/008434 A1 1/2021
WO WO 2021/027815 A1 2/2021

OTHER PUBLICATIONS

LG Electronics, "Discussion on resource allocation for NR sidelink Mode 1", 3GPP TSG RAN WG1 #98 Meeting, R1-1908901, Prague, Aug. 26-30, 2019.
(Continued)

*Primary Examiner* — Nimesh Patel
(74) *Attorney, Agent, or Firm* — Morgan, Lewis & Bockius LLP

(57) ABSTRACT

A feedback method, a communication node and a storage medium are provided. The feedback method includes: determining at least two feedback slots corresponding to a detect channel, and determining a feedback resource set contained in each of the at least two feedback slots; and sending feedback information for the detected channel through a target feedback resource in the feedback resource set in one or more of the at least two feedback slots.

20 Claims, 5 Drawing Sheets

(58) Field of Classification Search

CPC ....... H04L 5/00; H04L 5/0048; H04L 5/0053; H04L 5/0007; H04L 1/0026; H04L 1/1861; H04L 5/001; H04L 5/0094; H04L 1/0009; H04L 5/0057; H04L 1/0027; H04L 1/0618; H04L 1/0001; H04L 5/0016; H04L 5/0023; H04L 5/0035; H04L 5/006; H04L 5/0091; H04L 1/1887; H04L 27/26; H04L 27/2613; H04L 1/06; H04L 1/20; H04L 25/0224; H04L 27/10; H04L 25/0202; H04L 25/03292; H04L 27/2601; H04L 27/2657; H04L 5/0078; H04L 5/22; H04L 1/189; H04L 27/18; H04L 5/1469; H04L 1/0031; H04L 1/0693; H04L 2001/0096; H04L 41/14; H04L 5/16; H04L 5/023; H04L 1/0606; H04L 5/0044; H04L 5/0092; H04L 41/0803; H04L 5/003; H04L 5/0098; H04L 1/0007; H04L 25/0204; H04L 25/0254; H04L 47/826; H04L 47/76; H04L 43/0852; H04W 76/14; H04W 72/23; H04W 72/0446; H04W 72/20; H04W 72/21; H04W 74/0866; H04W 72/04; H04W 72/54; H04W 72/542; H04W 72/40; H04W 28/22; H04W 74/00; H04W 72/12; H04W 92/10; H04W 72/535; H04W 28/06; H04W 92/02; H04W 16/10; H04W 52/245; H04W 74/0836; H04W 28/0231; H04W 72/563; H04W 84/042; H04W 72/044; H04W 72/0453; H04W 72/232; H04W 74/0808; H04W 72/1268; H04W 72/02; H04W 28/26; H04W 74/0816; H04W 72/25; H04W 40/12; H04W 72/56; Y02D 30/70; H04B 7/0617; H04B 7/0626; H04B 7/0634; H04B 7/0408; H04B 7/0632; H04B 7/0417; H04B 7/0486; H04B 7/0663; H04B 2201/70703; H04B 7/2643; H04B 7/2628; H04B 17/373; H04B 17/24; H04B 7/0452; H04B 7/061; H04B 7/0636; H04B 17/327; H04B 17/345; H04B 7/0673; H04B 7/0697; H04B 2201/709709; H04B 7/212; H04B 17/309; H04B 7/0413; H04B 7/0619; H04B 7/0643; H04B 7/088; H04B 7/0652; H04B 17/382; H04B 7/0695; H04J 13/18; H04J 13/00; H04J 11/00; H04J 13/12; H04J 3/1694; H04J 3/00; H04J 4/00

See application file for complete search history.

(56) References Cited

U.S. PATENT DOCUMENTS

| | | | | |
|---|---|---|---|---|
| 2021/0099975 A1* | 4/2021 | Wu | ........................ | H04L 1/1819 |
| 2021/0203452 A1* | 7/2021 | Lin | ........................ | H04L 1/1819 |
| 2022/0094472 A1* | 3/2022 | Hwang | ................. | H04L 5/0082 |

OTHER PUBLICATIONS

International Search Report in Application No. PCT/CN2022/122472, dated Dec. 16, 2022, 4 pages, including translation.

* cited by examiner

FEEDBACK METHOD, COMMUNICATION NODE AND STORAGE MEDIUM

CROSS REFERENCE TO RELATED APPLICATIONS

This is a national stage application filed under 37 U.S.C. 371 based on International Patent Application No. PCT/CN2022/122472, filed Sep. 29, 2022, which claims priority to Chinese Patent Application No. 202111172739.7 filed Oct. 8, 2021, the disclosures of which are incorporated herein by reference in their entireties.

FIELD

This application relates to the technical field of wireless communication networks, for example, to a feedback method, a communication node and a storage medium.

BACKGROUND

For end-to-end side link (SL) communication, if the hybrid automatic repeat request (HARQ) is enabled, feedback resources exist at a fixed time domain position in the SL communication resource pool. For a detected channel, a resource block can be uniquely determined as a feedback resource according to predefined rules, and only one feedback occasion is provided for the detected channel. In the case where the receiving end fails in performing listen before talk (LBT) on the resources in the unlicensed frequency band at this feedback occasion, or cannot send feedback information due to power limitations or priority reasons, it will cause the sending end to determine that the data reception is failed, and to initiate an retransmission wrongly in a feedback manner of feedbacking acknowledgment (ACK) information or negative-acknowledge (NACK) information, or it will cause the sending end to determine that the reception is successful and not to perform necessary retransmission in a feedback manner of feedbacking only non-acknowledgement (NACK Only) information, and both of them significantly affect the transmission efficiency of SL.

SUMMARY

A feedback method, a communication node and a storage medium are provided according to the present application.

A feedback method is provided according to an embodiment of the present application.

The feedback method includes determining at least two feedback slots corresponding to a detect channel of at least one detected channel, and determining a feedback resource set contained in each of the at least two feedback slots; and sending feedback information for the detected channel through a target feedback resource in the feedback resource set in one or more of the at least two feedback slots.

A communication node is further provided according to an embodiment of the present application.

The communication node includes a memory, a processor, and a computer program stored in the memory and executable by the processor. The processor, when executing the program, implements the feedback method described above.

A computer-readable storage medium is further provided according to an embodiment of the present application. A computer program is stored in the computer-readable storage medium. The computer program, when being executed by a processor, implements the feedback method described above.

DETAILED DESCRIPTION

Figure 1:
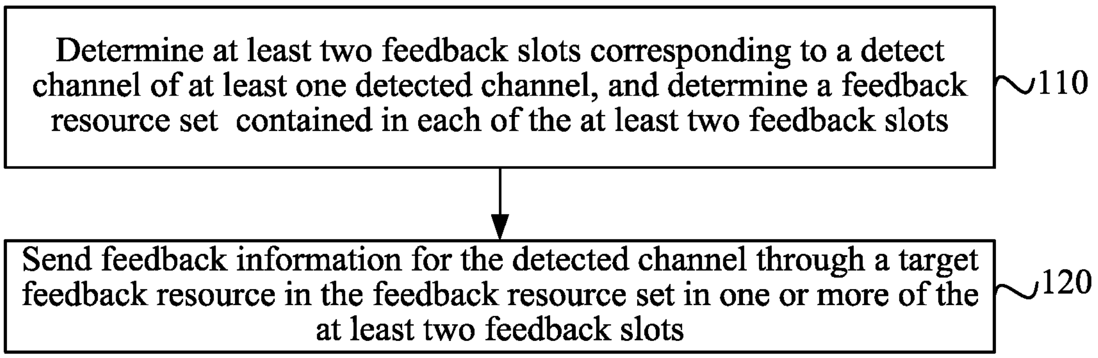
FIG. 1 is a flowchart of a feedback method according to an embodiment.

The present application is described hereinafter in conjunction with the drawings and embodiments. The embodiments described herein are merely intended to illustrate the present application. For convenience of description, only parts relevant to the present application are shown in the drawings.

In the process of SL communication, based on configured or preconfigured information, each SL user equipment (UE) can be allocated with a resource pool configuration of the SL communication. Based on the resource pool configuration, the SL communication of UE-to-UE supports unicast, multicast and broadcast. For unicast and multicast, the 3rd generation partnership project (3GPP) protocol supports enabling HARQ feedback. For unicast, the 3GPP protocol supports feedback of acknowledgment (ACK) information or negative-acknowledgement (NACK) information; and for multicast, the 3GPP protocol supports feedback of only negative-acknowledgement (NACK Only) information by group members for data, and also supports feedback of ACK information or NACK information. Regardless of the feedback manner, the feedback resource corresponding to each transmission channel is uniquely determined based on configured and/or preconfigured signaling. In the embodiments of the present application, the transmission channel includes a physical sidelink shared channel (PSSCH), and the corresponding feedback resource includes a physical sidelink feedback channel (PSFCH).

In the embodiments of the present application, a feedback method is provided. This feedback method is applied to a communication node, and the communication node is a receiving end in SL communication, for example, a receiving UE. The communication node can use multiple feedback time slots (abbreviated as slot) to provide multiple feedback occasions for a detected channel, to enable HARQ feedback information to be fed back to the sending end with a higher probability, thus reducing the effect on SL HARQ feedback caused by performing the LBT mechanism on unlicensed frequency bands, thereby improving communication efficiency and reliability.

FIG. 1 is a flowchart of a feedback method according to an embodiment. As shown in FIG. 1, the method according to this embodiment includes 110 and 120.

In 110, at least two feedback slots corresponding to a detected channel of at least one detected channel is determined and a feedback resource set contained in each of the at least two feedback slots is determined.

In 120, feedback information for the detected channel is sent through a target feedback resource in the feedback resource set in one or more of the at least two feedback slots.

In this embodiment, the detected channels include PSSCHs. For each detected channel, the communication node can use a target feedback resource in each of at least two feedback slots to send feedback information for each detected channel at least twice, thereby taking advantage of multiple feedback occasions to improve the success rate of feedback. Each feedback slot contains at least one feedback resource set, and each feedback resource set contains multiple feedback resources. For each feedback slot, which feedback resource is used as the target feedback resource corresponding to the detected channel can be determined based on a time-frequency position of the detected channel (the time-frequency position includes a slot position and a frequency domain position) and a time domain position relationship between the detected channel and the respective feedback slot. On this basis, a target feedback resource can be determined for the detected channel from the feedback resource set contained in each feedback slot, for sending feedback information for the detected channel: when data of the detected channel is received correctly, ACK information is fed back to a sending end at a specific position of the target feedback resource in each feedback slot; when the data of the detected channel is not received correctly, NACK information is fed back to a sending end at a specific position of the target feedback resource in each feedback slot; and when no data is received, no information can be fed back. On this basis, for the detected channel, feedback information can be sent using different target feedback resources in multiple feedback slots to improve communication reliability.

In an embodiment, the determining the at least two feedback slots corresponding to the detected channel includes: determining the at least two feedback slots based on at least two minimum feedback delays, where the at least two minimum feedback delays are in one-to-one mapping correspondence to the at least two feedback slots.

In this embodiment, the minimum feedback delay refers to the minimum limit of intervals between the detected channel and a feedback slot corresponding to the detected channel. An interval between a time domain position of the detected channel and each of the feedback slots is not smaller than a minimum feedback delay corresponding to the detected channel. The minimum feedback delay is, for example, the number of slots. The time domain position of the detected channel is denoted as slot n (Slot n). At least two minimum feedback delays are denoted as K(1), K(2), . . . , K(k), where k is the total number of the minimum feedback delays, $k \geq 2$, and in this case, the first one of the at least two feedback slots is not earlier than Slot n+K(1), and the second one of the at least two feedback slots is not earlier than Slot n+K(2), and in this manner, the k-th one of the at least two feedback slots is not earlier than Slot n+K(k).

In an embodiment, a feedback slot, among the at least two feedback slots, corresponding to a respective one of the at least two minimum feedback delays is: a first one of slots containing feedback resource, and an interval between each of the slots containing feedback resource and a slot in which the detected channel is located is greater than or equal to the respective one of the at least two minimum feedback delays.

In this embodiment, for a detected channel, the i-th (i=1, 2, . . . , k) feedback slot is the first one of slots containing feedback resource which is not earlier than Slot n+K(i), that is, the slot containing feedback resource which is not earlier than the Slot n+K(i) and is closest to the time domain position of this detected channel.

In the resource pool of SL communication, a feedback resources may not be configured for each slot. For example, the feedback resources have a PSFCH cycle. Assuming that the PSFCH cycle is 2, feedback resources are configured for every other slot. For example, Slot n+1 and Slot n+3 are configured with feedback resources, and Slot n+2 and Slot n+4 are not configured with any feedback resource. Assuming that for the detected channel, the i-th minimum feedback delay K(i)=2, the i-th feedback slot is the first slot containing feedback resources that is no earlier than Slot n+2. Since Slot n+2 is configured with no feedback resource therein, Slot n+3 is used as the i-th feedback slot corresponding to the detected channel. On this basis, multiple feedback occasions can be provided for the detected channel according to multiple minimum feedback delays, to make full use of limited feedback resources.

In an embodiment, the at least two minimum feedback delays are determined according to one of the following:

1) a configured value of each of the at least two minimum feedback delays, that is, k values of the at least two minimum feedback delays, which are K(1), K(2), . . . , K(k), are configured or preconfigured in the resource pool;
2) one of the at least two minimum feedback delays, the number of the at least two minimum feedback delays, and a feedback channel cycle, that is, configuring one minimum feedback delay k0, the number of minimum feedback delays k, and a feedback channel cycle N, thereby obtaining k minimum feedback delays: k0, k0+N, . . . , k0+(i−1)×N, . . . , k0+(k−1)×N; and
3) one of the at least two minimum feedback delay, the number of the at least two minimum feedback delays and a set time interval, that is, a minimum feedback delay k0, the number of minimum feedback delays k, and a set time interval G between every two minimum feedback delays are configured, and k minimum feedback delays: k0, k0+G, . . . , K+(i−1)×G, . . . , K+(k−1)×G are obtained; and
4) one of the at least two minimum feedback delays and a feedback delay offset set, that is, a minimum feedback delay k0 and a feedback delay offset set including k−1 delay offsets are configured, and k minimum feedback delays, which are k0, k0+offset(1), . . . , k0+offset (i−1), . . . , k0+offset(k−1), are obtained.

In an embodiment, each of the at least two feedback slots contains at least two feedback resource sets, and the number of the feedback resource sets is the same as the number of the minimum feedback delays. For each of the at least two feedback slots, a target feedback resource set contained in each of the at least two feedback slots corresponding to the detected channel, is determined according to an index of a minimum feedback delay, among the at least two minimum feedback delays, corresponding to each of the at least two feedback slots; and the target feedback resource belongs to the target feedback resource set.

Figure 2:
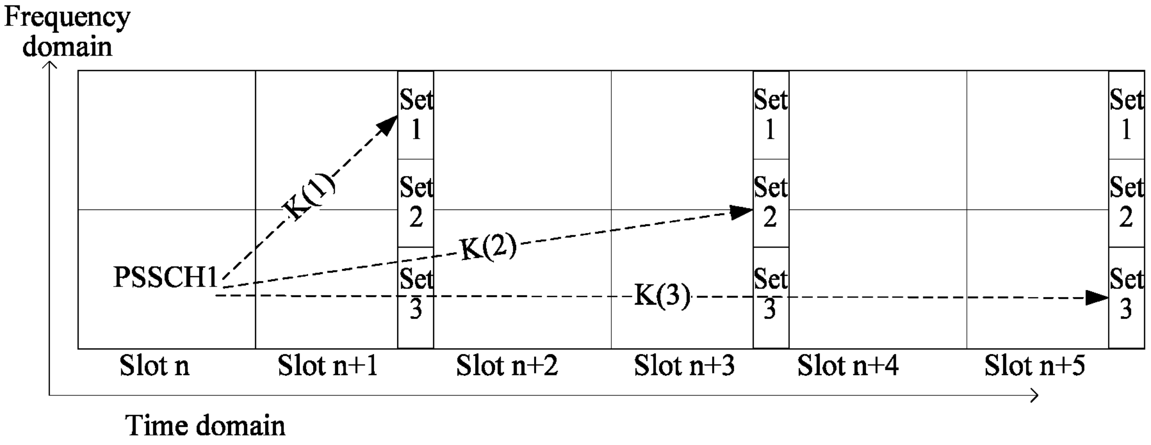
FIG. 2 is a schematic diagram showing that a feedback slot corresponds to multiple feedback resource sets according to an embodiment.

FIG. 2 is a schematic diagram showing that a feedback slot corresponds to multiple feedback resource sets according to an embodiment. As shown in FIG. 2, in this embodiment, for each feedback slot, k feedback resource sets for feedback are configured in the feedback slot in the resource pool. Taking k=3 as an example, each feedback slot is configured with three feedback resource sets, and the three feedback resource sets are denoted as set(1), set(2), and set(3) respectively. Each feedback resource set consists of multiple feedback resources. Assuming that for the detected channel, a feedback slot is determined based on the i-th minimum feedback delay, then within the feedback slot, according to the index i of the minimum feedback delay, one feedback resource set is uniquely determined from set(1), set(2), set(3) as the target feedback resource set, and further, a target feedback resource is determined from the target feedback resource set for sending feedback information.

As shown in FIG. 2, for the detected channel PSSCH1, three feedback slots are determined based on the three minimum feedback delays: slot n+1, slot n+3 and slot n+5. Each feedback slot is configured with three feedback resource sets. According to an index i of a minimum feedback delay based on which the PSSCH1 corresponds to each feedback slot, one feedback resource set can be uniquely determined from the k feedback resource sets in the respective feedback slot as a target feedback resource set, and a target feedback resource for sending feedback information can be determined from the target feedback resource set.

In an embodiment, the target feedback resource set includes at least one first set, and the feedback method further includes: for each of the at least two feedback slots, determining, according to an index of a time-frequency position of the detected channel, a first target set, contained in each of the at least two feedback slots corresponding to the detected channel, in the target feedback resource set, and determining the target feedback resource in the first target set.

In this embodiment, the first set is a subset of the target feedback resource set. Each feedback slot includes therein k feedback resource sets. A target feedback resource set can be determined from the k feedback resource sets according to the index i of the minimum feedback delay based on which the detected channel corresponds to the feedback slot. The target feedback resource set includes N first sets, N is the number of time-frequency positions of the detected channel corresponding to the feedback slot; according to an index of a time-frequency position of the detected channel, a first set can be determined from the N first sets as a first target set, and a target feedback resource for sending feedback information is further determined from the first target set. The target feedback resource in the first target set may be determined based on a source identifier (source ID) of a sending end, a member identifier (member ID) of a receiving end, and the total number of feedback resources in the first target set. The target feedback resource is a frequency domain and code domain resource element determined from the feedback resource set.

Figure 3:
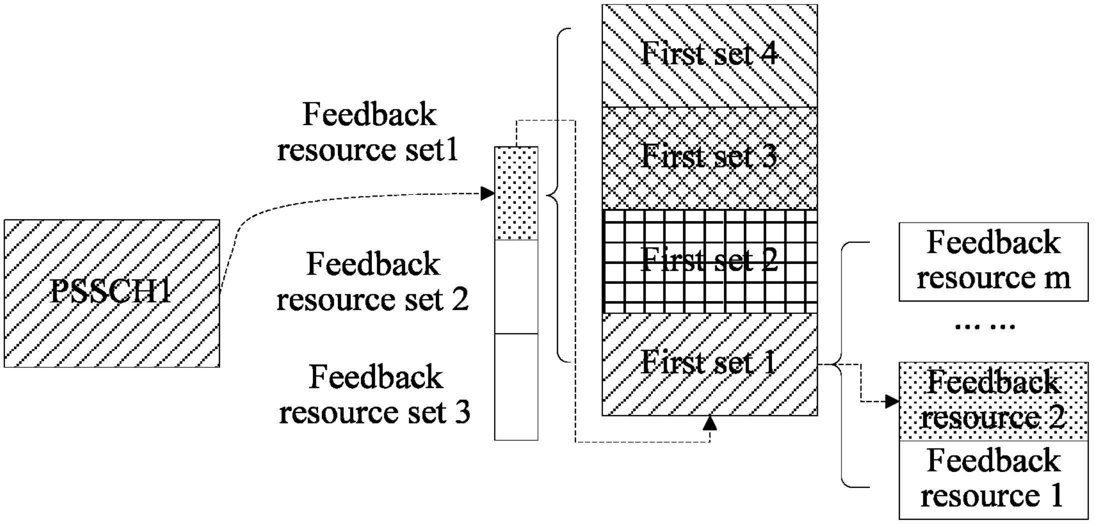
FIG. 3 is a schematic diagram of determining a target feedback resource according to an embodiment.

FIG. 3 is a schematic diagram of determining a target feedback resource according to an embodiment. As shown in FIG. 3, assuming k=3, one feedback slot of PSSCH1 includes three feedback resource sets, where the target feedback resource set is the feedback resource set 1, and the target feedback resource set can be determined according to the index of the minimum feedback delay based on which the detected channel corresponds to the feedback slot. The target feedback resource set further includes four first sets, and the first target set is the first set 1. The first target set can be determined according to the index of the time-frequency position of the PSSCH1. The first target set includes multiple feedback resources, and the target feedback resource is the feedback resource 2.

In an embodiment, L bits of feedback information for the detected channel is sent through the target feedback resource in the feedback resource set in one or more of the at least two feedback slots, where L is determined based on the number of transport blocks (TB) supported for transport on the time-frequency resource and the number of code blocks supported for transport when code block group (CBG) feedback is enabled, and L is greater than or equal to 1.

In this embodiment, L bits of feedback information is generated for each target feedback resource, where $L=L1\times L2$, L1 is the number of TBs that can be transported on one time-frequency resource, and L2 is the number of code blocks (CB) supported for transport in response to that CBG-based feedback mechanism is enabled.

In an embodiment, each of the at least two feedback slots contains one feedback resource set, and the one feedback resource set includes at least two second sets; for each of the at least two feedback slots, a second target set, contained in each of the at least two feedback slots corresponding to the detected channel, is determined according to an index of each of the at least two minimum feedback delays corresponding to each of the at least two feedback slots; and the target feedback resource belongs to the second target set.

In this embodiment, the second set is a subset of the feedback resource set. The second sets in the feedback resource set are in one-to-one mapping correspondence to the minimum feedback delays, and the correspondence may be configured, preconfigured, or predefined.

Figure 4:
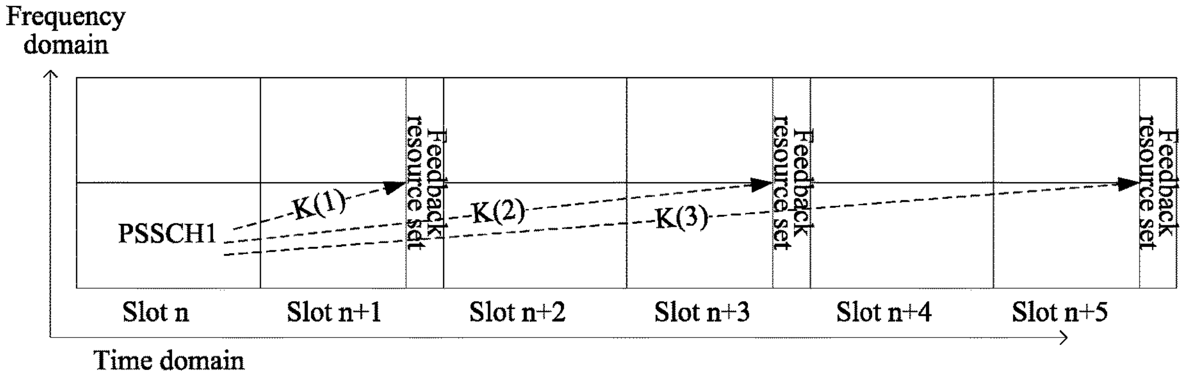
FIG. 4 is a schematic diagram showing that a feedback slot corresponds to one feedback resource set according to an embodiment.

FIG. 4 is a schematic diagram showing that a feedback slot corresponds to one feedback resource set according to an embodiment. As shown in FIG. 4, in this embodiment, for each feedback slot, one feedback resource set for feedback is configured for the respective feedback slot in the resource pool, and each feedback resource set includes at least two second sets, the number of the second sets is the same as the number k of the minimum feedback delays. Taking k=3 as an example, each feedback resource set is configured with k=3 second sets. Assuming that for the detected channel, a feedback slot is determined based on an i-th minimum feedback delay, then within the feedback slot, according to the index i of the minimum feedback delay, one second set can be uniquely determined from the three second sets as a second target set, and a target feedback resource is further determined from the second target set for sending feedback information.

As shown in FIG. 4, for the detected channel PSSCH1, three feedback slots are determined based on the three minimum feedback delays: slot n+1, slot n+3 and slot n+5. Each feedback slot is configured with one feedback resource set. The feedback resource set includes three second sets.

According to the index i of the minimum feedback delay based on which the PSSCH1 corresponds to each feedback slot, a second target set can be uniquely determined from the respective feedback resource set, and a target feedback resource for sending feedback information can be determined from the second target set.

In an embodiment, the second target set includes at least one third set; and the feedback method further includes: for each of the at least two feedback slots, determining, according to an index of a time-frequency position of the detected channel, a third target set, contained in each of the at least two feedback slots corresponding to the detected channel, in the second target set, and determining the target feedback resource in the third target set.

In this embodiment, the third set is a subset of the second target set, that is, a sub-subset of the feedback resource set. The second target set includes N third sets, and N is the number of time-frequency positions of the detected channel corresponding to each feedback slot. According to an index of a time-frequency position of the detected channel, one third set is determined from the N third sets as a third target set, and a target feedback resource is further determined from the third target set for sending feedback information. The target feedback resource in the third target set may be determined based on a source ID of a sending end, a member ID of a receiving end, and the total number of feedback resources in the second target set. The target feedback resource is a frequency domain and code domain resource element determined from the feedback resource set.

Figure 5:
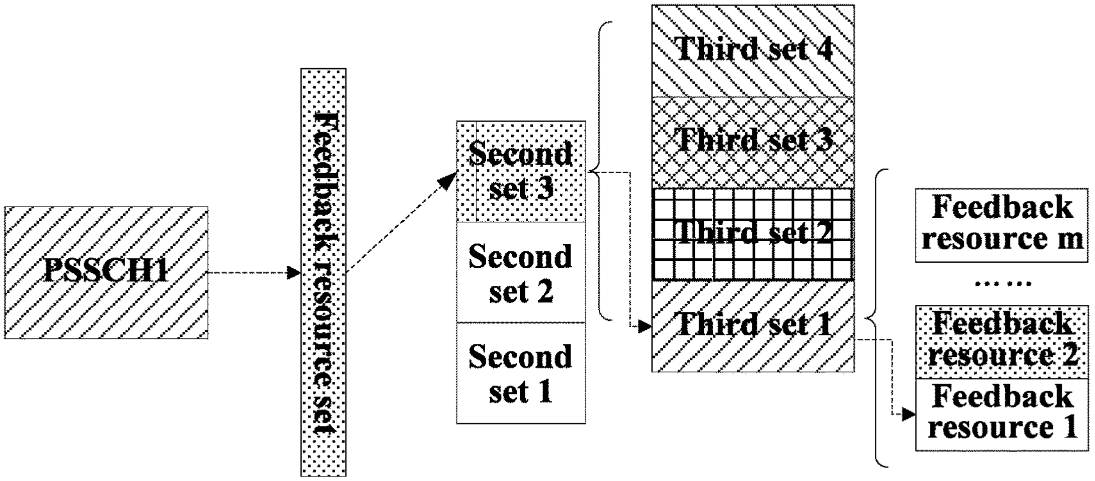
FIG. 5 is another schematic diagram of determining a target feedback resource according to an embodiment.

FIG. 5 is another schematic diagram of determining a target feedback resource according to an embodiment. As shown in FIG. 5, assuming k=3, one feedback slot of PSSCH1 includes one feedback resource set, and the feedback resource set includes k=3 second sets, where the second target set is a second set 3, and the second target set can be determined according to the index of the minimum feedback delay based on which the detected channel corresponds to the feedback slot. The second target set further includes N=4 third sets, the third target set is the third set 1, and the third target set can be determined according to the index of the time-frequency position of the PSSCH1. The third target set includes multiple feedback resources, and the target feedback resource is the feedback resource 2.

In this embodiment, L bits of feedback information is generated on each target feedback resource, where L=L1×L2, L1 is the number of TBs that can be transported on one time-frequency resource, and L2 is the number of code blocks supported for transport in response to that CBG-based feedback mechanism is enabled.

In an embodiment, each of the at least two feedback slots contains one feedback resource set, and the one feedback resource set comprises at least one fourth set; and for each of the at least two feedback slots, a fourth target set, contained in each of the at least two feedback slots corresponding to the detected channel, is determined according to an index of a time-frequency position of the detected channel, and the target feedback resource belongs to the fourth target set.

In this embodiment, the fourth set is a subset of the feedback resource set. The feedback resource set includes N fourth sets, and N is the number of time-frequency positions of the detected channel corresponding to each feedback slot. According to an index of a time-frequency position of the detected channel, one fourth set is determined from the N fourth sets as a fourth target set, and a target feedback resource is determined from the fourth target set for sending feedback information.

Figure 6:
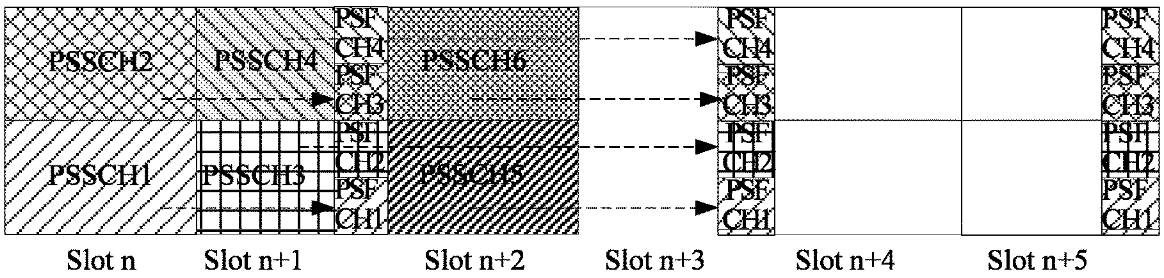
FIG. 6 is a schematic diagram showing correspondence between indices of time-frequency positions of detected channels and feedback resource sets according to an embodiment.

FIG. 6 is a schematic diagram showing correspondence between indices of time-frequency positions of detected channels and feedback resource sets according to an embodiment. As shown in FIG. 6, four subsets PSFCH1, PSFCH2, PSFCH3 and PSFCH4 are configured in each feedback slot. Each subset corresponds to a slot position and a frequency domain (subchannel) position in the corresponding slot. Each subset can be determined according to the first one (the minimum feedback delay with the smallest value) K(1) of the k minimum feedback delays.

In an embodiment, the fourth target set includes at least two fifth sets; and the feedback method further includes: for each of the at least two feedback slots, determining, according to an index of each of the at least two minimum feedback delays corresponding to each of the at least two feedback slots, a fifth target set, contained in each of the at least two feedback slots corresponding to the detected channel, in the fourth target set, and determining the target feedback resource in the fifth target set.

In this embodiment, the fifth set is a subset of the fourth target set, that is, a sub-subset of the feedback resource set. The fourth target set includes k fifth sets, and k is the number of minimum feedback delays. According to an index of a minimum feedback delay based on which the detected channel corresponds to each feedback slot, a fifth set is determined from the k fifth sets as the fifth target set, and a target feedback resource is determined from the fifth target set for sending feedback information. The target feedback resource in the fifth target set can be determined based on a source ID of a sending end, a member ID of a receiving end, and the total number of feedback resources in the fifth target set. The target feedback resource is a frequency domain and code domain resource element determined from the feedback resource set.

Figure 7:
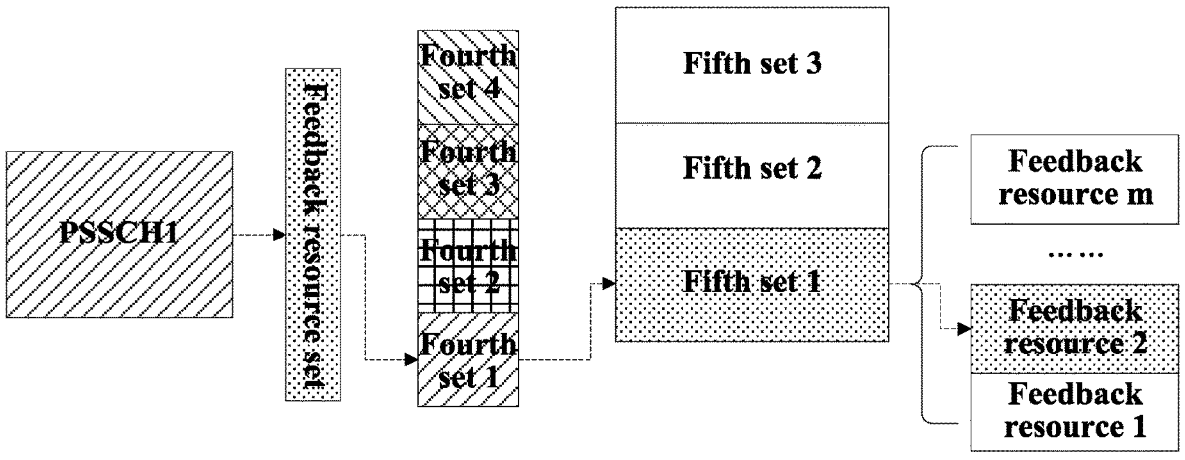
FIG. 7 is another schematic diagram of determining a target feedback resource according to an embodiment.

FIG. 7 is another schematic diagram of determining a target feedback resource according to an embodiment. As shown in FIG. 7, assuming k=3, one feedback slot of PSSCH1 includes a feedback resource set, and the feedback resource set includes N=4 fourth sets. A fourth target set is the fourth set 1, and the fourth target set can be determined according to an index of a time-frequency position of PSSCH1; the fourth target set further includes k=3 fifth sets, and the fifth target set is the fifth set 1. The fifth target set can be determined according to the index of the minimum feedback delay based on which the detected channel corresponds to the feedback slot. The fifth target set includes multiple feedback resources, and the target feedback resource is the feedback resource 2.

In this embodiment, L bits of feedback information is generated for each target feedback resource, where L=L1×L2, L1 is the number of TBs that can be transported on one time-frequency resource, and L2 is the number of code blocks supported for transport when CBG-based feedback mechanism is enabled.

In an embodiment, each of the at least two feedback slots contains one feedback resource set, and the one feedback resource set comprises at least one sixth set; each of the at least two feedback slots contains a same sixth target set among the at least one sixth set. The feedback method further includes: for each of the at least two feedback slots, determining the target feedback resource according to an index of a time-frequency position of the detected channel in the same sixth target set.

In this embodiment, the sixth set is a subset of the feedback resource set. The feedback resource set includes N sixth sets. In all the feedback slots, the same sixth set can be determined from the N sixth sets as the sixth target set according to an index of a time-frequency position of the detected channel, and a target feedback resource is determined from the sixth target set for sending feedback information according to the index of the time-frequency position of the detected channel. The target feedback resource in the sixth target set can be determined based on a source ID of a sending end, a member ID of a receiving end, and the total number of feedback resources in the sixth target set. The target feedback resource is a frequency domain resource element determined from the feedback resource set. Frequency domain resource elements determined in the feedback slots according to minimum feedback delays corresponding to the detected channel are at the same position.

Figure 8:
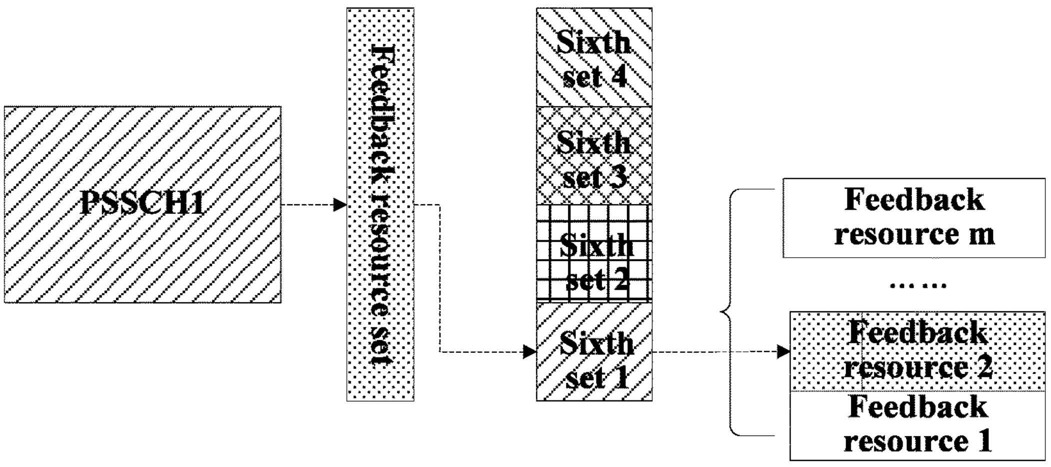
FIG. 8 is another schematic diagram of determining a target feedback resource according to an embodiment.

FIG. 8 is another schematic diagram of determining a target feedback resource according to an embodiment. As shown in FIG. 8, each feedback slot of PSSCH1 includes one feedback resource set, and the one feedback resource set includes N=4 sixth sets, regardless of the index of the minimum feedback delay based on which the detected channel corresponds to each feedback slot, a sixth target set in each feedback slot is the sixth set 1, the sixth target set includes multiple feedback resources, and a target feedback resource is the feedback resource 2.

In an embodiment, for each of the at least two feedback slots, an orthogonal cover code (OCC) corresponding to the target feedback resource in the same sixth target set is determined according to an index of each of the at least two minimum feedback delays corresponding to each of the at least two feedback slots.

In this embodiment, the positions of the target feedback resources determined in the feedback slots according to the minimum feedback delays corresponding to the detected channel are the same, but OCCs used for the same feedback resources in the feedback slots are different. In the resource pool, k OCCs are configured, and denoted as OCC1, . . . , OCC(i), . . . , OCC(k). The k OCCs are in one-to-one mapping correspondence to the k minimum feedback delays. For example, OCC(i) corresponds to K(j), the correspondence may be configured, preconfigured, or predefined.

In an embodiment, for each of the at least two feedback slots, spread spectrum is performed on the feedback information sent through the target feedback resource contained in each of the at least two feedback slots, and the feedback information with spread spectrum is multiplied by an OCC corresponding to an index of one of the at least two minimum feedback delays corresponding to each of the at least two feedback slots.

In this embodiment, for the target feedback resource corresponding to the minimum feedback delay K(j), spread spectrum is performed on the feedback information sent through the target feedback resource and the feedback information with spread spectrum is multiplied by OCC(i) corresponding to the minimum feedback delay K(j).

In an embodiment, sending the feedback information through the target feedback resource in the feedback resource set contained in one or more of the at least two feedback slots includes: sending k groups of the feedback information of L bits in total through the target feedback resource in the feedback resource set, where k is a number of minimum feedback delays, and L is determined based on a number of transport blocks supported for transport on the time-frequency resource, a number of code blocks supported for transport when code block group feedback is enabled and the number of minimum feedback delays.

In this embodiment, L bits of feedback information is generated on each target feedback resource, where $L=L1\times L2\times k$, L1 is the number of TBs that can be transported on one time-frequency resource, and L2 is the number of code blocks supported for transport when the CBG-based feedback mechanism is enabled. The L bits of feedback information can be divided into k groups, each group is $L1\times L2$ bits, so that the transmitting UE knows the bits of the feedback information, so as to accurately demodulate the feedback information.

In an embodiment, the feedback method further includes the following.

In response to that data of the detected channel is correctly received, the k groups of feedback information are generated on the target feedback resource in the one of the at least two feedback slots, where the k groups of feedback information comprises one group of feedback information being valid acknowledgment information, and remaining k−1 groups of feedback information being padded negative-acknowledgment information, and where a position of the valid acknowledgment information in the k groups of feedback information is determined according to an index of the one of the at least two minimum feedback delays corresponding to the detected channel and the target feedback resource.

In response to that data of the detected channel is not correctly received, the k groups of feedback information are generated on the target feedback resource in the one of the at least two feedback slots, where the k groups of feedback information comprises one group of feedback information being valid negative-acknowledgment information, and remaining k−1 groups of feedback information being padded negative-acknowledgment information, and where a position of the valid negative-acknowledgment information in the k groups of feedback information is determined according to an index of the one of the at least two minimum feedback delays corresponding to the detected channel and the target feedback resource.

In response to that data of the detected channel is not received or data of a control channel associated with the detected channel is not correctly received, the k groups of feedback information are not generated.

In this embodiment, for the case where different OCCs are used for the same feedback resources in feedback slots, the L bits of feedback information can be divided into k groups. According to an index i of a minimum feedback delay, the i-th group of feedback information in the k groups of feedback information is normally generated based on the decoding situation of the data received by the receiving end. That is, when the data of the detected channel is received correctly, valid ACK information is generated. When the data of the detected channel is not received correctly, valid NACK information is generated, other remaining groups of feedback information is padded with NACK information. When the data of the detected channel is not received or the data of the control channel associated with the detected channel is not received correctly, no feedback information is generated. The control channel associated with the detected channel refers to the physical sidelink control channel (PSCCH).

In an embodiment, the feedback method further includes in response to that time-frequency positions of target feedback resources respectively corresponding to P detected channels of the at least one detected channel are the same, merging feedback information corresponding to each of the P detected channels. The merging the feedback information corresponding to each of the P detected channels includes: according to indices of minimum feedback delays of the at least two minimum feedback delays corresponding to the P detected channels and the target feedback resources, padding valid acknowledgment information or valid negative-acknowledgment information in the k groups of feedback information corresponding to each of the P detected channels into p respective groups in the k groups of feedback information, where remaining k-p groups of feedback information in the k groups of feedback information is padded with negative-acknowledgment information, to obtain merged feedback information.

In this embodiment, in response to that the listened-to P (P≤k) channels correspond to the same target feedback resource and the same receiving end is required to feedback, each channel corresponds to k groups of feedback information. Since the minimum feedback delays based on which the P channels correspond to the same target feedback resource are different, the k groups of feedback information corresponding to each of the P channels can be merged, to obtain one merged k groups of feedback information, and the valid feedback information of the P channels (valid ACK information or valid NACK information) is padded with corresponding groups of the k groups of feedback information respectively according to indices of the minimum feedback delays corresponding to the above feedback resources.

In an embodiment, in response to that the P channels include channels of different sending ends, an OCC corresponding to the merged feedback information takes a predefined, preconfigured or configured value; and in response to that the P channels are channels of the same sending end, an OCC of the merged feedback information takes an OCC corresponding to one of the at least two minimum feedback delays corresponding to a detected channel, located at a predetermined position, a preconfigured position or a configured position, of the P detected channels and the target feedback resources.

In an embodiment, sending the feedback information through the target feedback resource in the feedback resource set contained in one or more of the at least two feedback slots includes: for each of the at least one detected channel, sending the feedback information for each of the at least one detected channel through the target feedback resource in the feedback resource set in one or more of the at least two feedback slots corresponding to each of the at least one detected channel.

In this embodiment, in the process of merging feedback information corresponding to the P channels, the OCC of the merged feedback information is determined according to the following:

1) in response to that the merged feedback information is for channels of different sending ends, an OCC of the merged feedback information takes a predefined, preconfigured or configured value, for example OCC=1; and
2) in response to that the merged feedback information is for channels of the same sending end, an OCC of the merged feedback information takes an OCC corresponding to a minimum feedback delay which corresponds to a channel at a specified position and the target feedback resource, for example, an OCC corresponding to a minimum feedback delay which corresponds to a last transmitted PSSCH, or an OCC corresponding to a minimum feedback delay which corresponds to a first transmitted PSSCH.

In SL communication, when HARQ feedback is enabled, channels have a fixed mapping relationship with feedback slots (i.e., PSSCHs have a fixed mapping relationship with PSFCH feedback slots). The PSFCH feedback slots are configured according to a cycle in time domain. For one PSSCH received in the resource pool by a receiving end, the receiving end determines a target feedback resource corresponding to the PSSCH data (i.e., PSFCH feedback resource) in accordance with the following.

In a first step (briefed as S10), PSFCH feedback slots corresponding to a PSSCH are determined.

For any one minimum feedback delay K(i), a feedback slot corresponding to a PSSCH is the first one of slots containing PSFCH feedback resource in a resource pool and intervals between the slots containing PSFCH feedback resource and the slot in which the PSSCH is located is not less than k(i) slots. Based on k minimum feedback delays, for one received PSSCH, the receiving end determines k PSFCH feedback slots satisfying the minimum feedback delay.

In a second step (briefed as S20), PSFCH feedback resource sets corresponding to the PSSCH are determined.

Each PSFCH feedback slot in the resource pool is configured with one or k feedback resource sets, set(1), set(2), . . . , set(k), for HARQ feedback, k feedback resource sets are in one-to-one mapping correspondence to indices of k minimum feedback delays. This correspondence can be configured, preconfigured, or predefined. Each feedback resource set consists of multiple PSFCH feedback resources.

In a third step (briefed as S30), PSFCH feedback resources corresponding to the PSSCH are determined. S30 includes any one of the following manners.

In a manner A, each PSFCH feedback slot is configured with k feedback resource sets for HARQ feedback. For the i-th minimum feedback delay K(i) of the PSSCH, in a uniquely determined feedback resource set(j) for a determined PSFCH feedback slot, a PSFCH feedback resource subset (i.e., a first target set) within the feedback resource set(j) is determined first based on the slot position and frequency domain position of the PSSCH, and a target feedback resource is determined within the PSFCH feedback resource subset. The target feedback resource is uniquely determined based on a source ID of a sending end, a member ID of a receiving end, and the total number of feedback resources in the subset. The target feedback resource is a frequency domain and code domain resource element determined from the feedback resource set; and on this basis, the receiving end can generate L bits of feedback information, $L=L1\times L2$, corresponding to the PSSCH on the target feedback resource.

In a manner B, each PSFCH feedback slot is configured with one feedback resource set for HARQ feedback. The feedback resource set is divided into k subsets, denoted as subset(1), . . . , subset(i), . . . , subset(k) respectively. The k subsets are in one-to-one mapping correspondence to k feedback delay indices. This correspondence can be configured, preconfigured, or predefined. A j-th subset(j) determined based on the i-th minimum feedback delay of the PSSCH includes N sub-subsets, where N is the number of time-frequency positions of the detected channel corresponding to the feedback slot. A PSFCH sub-subset within the subset(j) is determined based on the frequency domain position and slot position in which the PSSCH is located, and one target feedback resource is determined within the PSFCH sub-subset. The target feedback resource is uniquely determined based on a source ID of a sending end, a member ID of a receiving end, and the total number of feedback resources in the PSFCH sub-subset. The target feedback resource is a frequency domain and code domain resource element determined from the feedback resource set. On this basis, the receiving end can generate L bits of feedback information, $L=L1\times L2$, corresponding to the PSSCH on the target feedback resource.

In a manner C, each PSFCH feedback slot is configured with one feedback resource set for HARQ feedback. The feedback resource set is divided into N subsets, N is the number of time-frequency positions of the detected channel corresponding to the feedback slot. One subset is determined according to a slot position and a frequency domain position within the SL resource pool where the PSSCH is located, and the subset is divided into K sub-subsets, denoted as sub-subset(1), . . . , sub-subset(i), . . . , sub-subset(k) respectively. The k sub-subsets are in one-to-one mapping correspondence to k feedback delay indices. This correspondence can be configured, preconfigured, or predefined. One target feedback resource is determined in a j-th feedback sub-subset(j) determined based on the i-th minimum feedback delay k(i) of the PSSCH. The target feedback resource is uniquely determined based on a source ID of a sending end, a member ID of a receiving end, and the total number of feedback resources in the feedback sub-subset(j). The target feedback resource is a frequency domain and code domain resource element determined from the feedback resource set. On this basis, the receiving end can generate L bits of feedback information, L=L1×L2, corresponding to the PSSCH on the target feedback resource.

In a manner D, each PSFCH feedback slot is configured with one feedback resource set for HARQ feedback. A subset within the feedback resource set is determined according to a frequency domain position and a slot position in which the PSSCH is located. The subsets determined within the feedback resource sets in the feedback slots based on the k minimum feedback delays of the PSSCH are the same. k OCCs are configured in the resource pool, which are denoted as OCC1, . . . , OCC(i), . . . , OCC(k) respectively. The k OCCs are in one-to-one mapping correspondence to k minimum feedback delays of the PSSCH. This correspondence can be configured, preconfigured, or predefined. For example, OCC(i) uniquely corresponds to K(j). A target feedback resource is determined in the subset, and the target feedback resource is uniquely determined based on a source ID of a sending end, a member ID of a receiving end, and the total number of feedback resources in the subset. The target feedback resource is a frequency domain and code domain resource element determined from the feedback resource set. The frequency domain resource elements determined in the feedback slots based on the minimum feedback delays corresponding to the PSSCH are the same in position, but the OCCs used for the same target feedback resources in the feedback slots are different. In response to that a feedback resource corresponds to the PSSCH with the minimum feedback delay of K(j), spread spectrum is performed on the data on the feedback resource and the data with spread spectrum is multiplied by the orthogonal code OCC(i) corresponding to the minimum feedback delay; and the receiving end generates L bits of feedback information, L=L1×L2×k, corresponding to the PSSCH on the determined feedback resource.

From the above methods for determining a PSFCH feedback resource, it can be known that for the reception of a PSSCH, there are four corresponding manners for determining the feedback resources.

The four corresponding manners are respectively: a method 1: S10+S20+S30-A; a manner 2: S10+S20+S30-B; a manner 3: S10+S20+S30-C; and a manner 4: S10+S20+S30-D.

In the above four manners, the PSFCH target feedback resources determined in the manner 1, manner 2 and manner 3 are in one-to-one mapping correspondence to the PSSCHs, and the target feedback resource corresponds to a resource element with a determined frequency domain and code domain of the slot in which the PSFCH resource is located. Therefore, on the PSFCH target feedback resource corresponding to the PSSCH, the receiving end is only required to perform feedback for the PSSCH uniquely corresponding to the target feedback resource.

For the manner 4, in the determined PSFCH feedback resources, the k feedback resource sets corresponding to each PSSCH correspond to the feedback resource sets in the same frequency domain in different PSFCH feedback slots, and the feedback resource sets corresponding to the PSSCHs possibly correspond to the same subset within the same feedback resource set, such a correspondence will cause one PSFCH target feedback resource to correspond to multiple PSSCHs, and what the target feedback resource corresponds to is a determined frequency domain resource element in the slot in which the PSFCH resource is located. Therefore, on the PSFCH target feedback resource corresponding to one PSSCH, the receiving end may also need to perform feedback on other PSSCHs besides the PSSCH.

Figure 9:
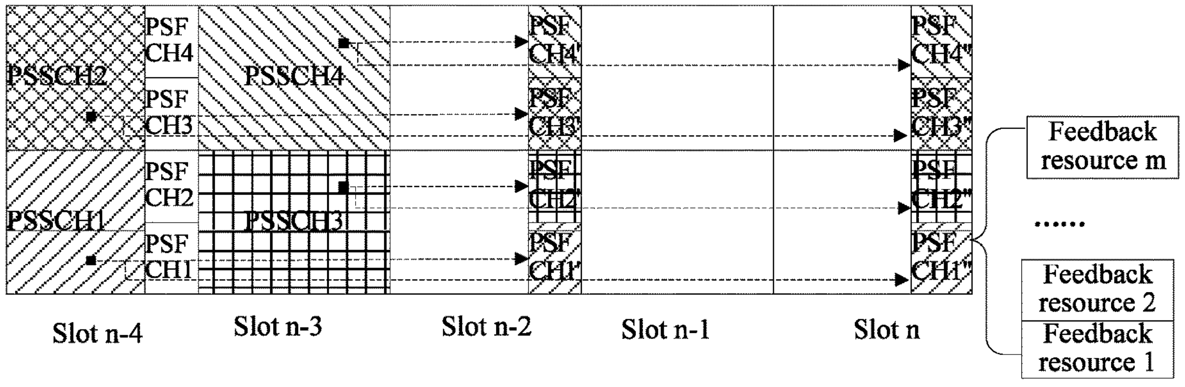
FIG. 9 is a schematic diagram showing that time-frequency positions of target feedback resources in each of the feedback slots are the same according to an embodiment.

FIG. 9 is a schematic diagram showing that time-frequency positions of target feedback resources in each of the feedback slots are the same according to an embodiment. In FIG. 9, each channel and the corresponding subset are padded with the same texture. As shown in FIG. 9, assuming that the PSFCH cycle is 2 and the number of the minimum feedback delays is 2, K={1,3}, two feedback slots are determined for PSSCH1 received in slot n−4, slot n−2 and slot n. The feedback resource set in each feedback slot includes two subsets. The feedback resource set corresponding to the PSSCH1 in the slot n−2 is denoted as a PSFCH1', and the feedback resource set corresponding to the PSSCH1 in the slot n is denoted as a PSFCH1", the PSFCH1' and the PSFCH1" have the same time-frequency position.

Figure 10:
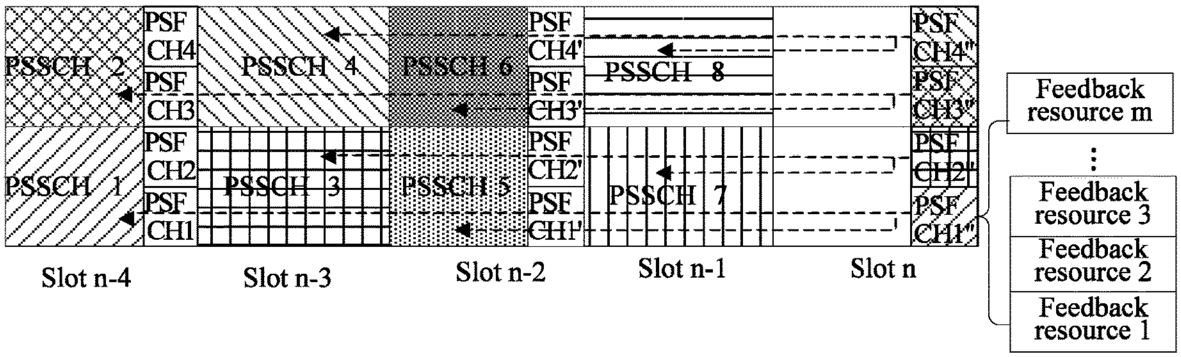
FIG. 10 is a schematic diagram showing that a feedback slot corresponds to multiple detected channels according to an embodiment.

FIG. 10 is a schematic diagram showing that a feedback slot corresponds to multiple detected channels according to an embodiment. According to the correspondence between PSSCHs and PSFCHs in the manner 4, each PSFCH feedback resource also correspond to two PSSCH resources in reverse. As shown in FIG. 10, for transports on PSSCH1 and PSSCH5, it is assumed that the target feedback resource corresponding to the second minimum feedback delay of PSSCH1 is PSFCH1", and the target feedback resource corresponding to the first minimum feedback delay of PSSCH5 is also PSFCH1", and the receiving end performs feedback PSSCH1 and PSSCH5 respectively on the target feedback resource in the feedback resource set PSFCH1".

When the receiving end performs feedback on the target feedback resource corresponding to a feedback delay K(i) of the PSSCH, feedback information is generated as follows. According to the number of minimum feedback delays k configured or preconfigured by a system, L bits of HARQ feedback information, L=L1×L2×k, is fixedly generated, where L1 denotes the number of code streams that can be transported on a time-frequency resource, and L2 denotes the number of CBs included in a CBG when CBG-based feedback is supported.

The above four manners for determining feedback resources are described below through embodiments.

Embodiment 1

Example 1

For a resource pool configuration, it is assumed that the PSFCH cycle N=2, three minimum feedback delays, K={1, 3,5}, are configured, only one TB is transported on one time-frequency resource, and CBG feedback is not enabled.

In each PSFCH feedback slot, three PSFCH feedback resource sets, set1, set2, and set3, are correspondingly configured. The PSFCH feedback resource set set1 contains M1 frequency domain and code domain PSFCH feedback resources; the PSFCH feedback resource set set2 contains M2 frequency domain and code domain PSFCH feedback resources; and the PSFCH feedback resource set set3 contains M3 frequency domain and code domain PSFCH feedback resources. The three minimum feedback delays are in one-to-one mapping correspondence to the three PSFCH feedback resource sets, and the correspondence is: K(1)=1 corresponding to the set 1, K(2)=3 corresponding to the set 2, and K(3)=5 corresponding to the set 3.

As shown in FIG. 2, for the PSSCH1 transmitted in the slot n, the minimum feedback delay K(1) corresponds to the PSFCH feedback slot, slot n+1, and the PSFCH feedback resource set set1; the minimum feedback delay K(2) corresponds to the PSFCH feedback slot, slot n+3, and the PSFCH feedback resource set set2; and the minimum feedback delay K(3) corresponds to the PSFCH feedback slot, slot n+5, and the PSFCH feedback resource set, set3.

Within the corresponding feedback resource sets of the feedback slots, subsets are determined based on the slot position and frequency domain subchannel position in which the PSSCH is located. As shown in FIG. 3, based on the PSSCH1, the subset within the PSFCH feedback resource set set1 for the feedback delay K(1) is determined to be a first set 1.

The target feedback resource in each of the PSFCH feedback slots is determined based on a source ID of a transmitting UE, a member ID of a receiving UE and the number of frequency domain and code domain resource elements in the first set 1 together. As shown in FIG. 3, a feedback resource 2 in the first set 1 is used as the final target feedback resource corresponding to the PSSCH. The target feedback resource corresponds to a resource block (RB) position or an interleaved position in the frequency domain, and a cyclic shift value in the code domain.

After the target feedback resource is determined, the receiving UE performs feedback on the PSSCH1 on the feedback resource 2 in the first set 1 of the PSFCH feedback resource set set1 in slot n+1, on the feedback resource 2 in the first set 1 of the PSFCH feedback resource set set2 in slot n+3, and on the feedback resource 2 in the first set 1 of the PSFCH feedback resource set set3 in slot n+5 as follows.

When data of the PSSCH1 is not received by the receiving UE, no feedback is performed; when data of the PSSCH1 is received correctly by the receiving UE, valid ACK information is fed back; and when data of the PSSCH1 is not correctly received by the receiving UE, valid NACK information is fed back.

Example 2

The difference of the example 2 from the example 1 lies in the configuring and determining the minimum feedback delays. In the SL communication resource pool, a minimum feedback delay is configured as K(1)=1, and the number, N, of the minimum feedback delays is configured to be 3, a set time interval is configured as G=2. Based on these information, the receiving UE can determine three minimum feedback delays, respectively: K(1)=1; K(2)=K(1)+2=3; K(3)=K(2)+2=5. Other operations are the same as those in the example 1.

Example 3

The difference of the example 3 from the example 1 lies in configuring and determining the minimum feedback delays. In the SL communication resource pool, a minimum feedback delay is configured as K(1)=1, and an offset set of the minimum feedback delays is configured as {2, 4}. Based on these information, the receiving UE can determine three minimum feedback delays, respectively: K(1)=1; K(2)=K(1)+offset(1)=3; K(3)=K(1)+offset(2)=5. Other operations are the same as those in the example 1.

Example 4

The difference of the example 4 from the example 1 lies in configuring and determining the minimum feedback delays. In the SL communication resource pool, a minimum feedback delay is configured as K(1)=1, and the number of the minimum feedback delays is configured to be k, a PSFCH cycle is configured to be 2. Based on these information, the receiving UE can determine three minimum feedback delays as: K(1)=1; K(2)=K(1)+(2−1)×2=3; K(3)=K(1)+(3−1)×2=5. Other operations are the same as those in the example 1.

Embodiment 2

For a resource pool configuration, it is assumed that the PSFCH cycle N=2, three minimum feedback delays are configured, K={1, 3, 5}, only one TB is transported on one time-frequency resource, and CBG feedback is not enabled.

In each PSFCH feedback slot, one PSFCH feedback resource set is configured correspondingly and divided into three PSFCH feedback subsets: subset(1), subset(2) and subset(3). The division of the one PSFCH feedback resource set can be predefined, preconfigured or configured based on the resource pool.

One of predefined divisions of the one PSFCH feedback resource set is described as follows.

The feedback resource set, set, contains a total of Q PSFCH feedback resources. The first one to a floor(Q/3)-th one of PSFCH feedback resources belong to the subset(1), and the (floor(Q/3)+1)-th one to the floor (2×Q/3)-th one of PSFCH feedback resources belong to the subset(2), and the remaining PSFCH feedback resources belong to the subset (3), where floor( ) denotes rounding down. The predefined division result is as follows.

The subset(1) contains M1 frequency domain and code domain PSFCH feedback resources; the subset(2) contains M2 frequency domain and code domain PSFCH feedback resources; and the subset(3) contains M3 frequency domain and code domain PSFCH feedback resources.

The three minimum feedback delays are in one-to-one mapping correspondence to the PSFCH feedback subsets. The correspondence is: K(1)=1 corresponding to the set subset(1), K(2)=3 corresponding to the set subset(2), and K(3)=5 corresponding to the set subset(3).

As shown in FIG. 4, for PSSCH1 transported in the slot n, the minimum feedback delay K(1) corresponds to the PSFCH feedback slot, slot n+1, the PSFCH feedback resource set, set, and the PSFCH feedback subset, subset(1); the minimum feedback delay K(2) corresponds to the PSFCH feedback slot, slot n+3, the PSFCH feedback resource set, set, and the PSFCH feedback subset, subset(2); and the minimum feedback delay K(3) corresponds to the PSFCH feedback slot, slot n+5, the PSFCH feedback resource set, set, and the PSFCH feedback subset, subset(3).

In the corresponding subsets of the feedback slots, the PSFCH feedback sub-subset Sub-subset is determined according to the slot position and the frequency domain subchannel position in which the PSSCH is located. As shown in FIG. 5, a subset, that is, a second set 3, within the feedback resource set is determined based on the PSSCH1 for the feedback delay K(1), and a sub-subset, that is, a third set 1, is determined from the second set 3, and the target feedback resource in each of the PSFCH feedback slots is determined according to a source ID of a transmitting UE, a member ID of a receiving UE and the number of frequency domain code domain resource elements in the third set 1 together. As shown in FIG. 5, a feedback resource 2 in the third set 1 is determined as the final target feedback resource corresponding to the PSSCH. The target feedback resource corresponds to an RB position or an interleaved position in the frequency domain, and a cyclic shift value in the code domain.

After the target feedback resource is determined, the receiving UE performs feedback PSSCH1 on the feedback resource 2 in the third set 1 in a subset, corresponding to K(1), of the feedback resource set in slot n+1, performs feedback PSSCH1 on the feedback resource 2 in the third set 1 in a subset, corresponding to K(2), of the feedback resource set in slot n+3, and performs feedback PSSCH1 on the feedback resource 2 in the third set 1 in a subset, corresponding to K(3), of the feedback resource set in slot n+5 as follows.

When data of the PSSCH1 is not received by the receiving UE, no feedback is performed; when data of the PSSCH1 is received correctly by the receiving UE, valid ACK information is fed back; and when data of the PSSCH1 is not correctly received by the receiving UE, valid NACK information is fed back.

Embodiment 3

For a resource pool configuration, it is assumed that the PSFCH cycle N=2, three minimum feedback delays are configured, K={1, 3, 5}, only one TB is transported on one time-frequency resource, and CBG feedback is not enabled.

In each PSFCH feedback slot (slot n+1, slot n+3, slot n+5, . . . ), a PSFCH feedback resource set is configured, and according to the number, two, of subchannels configured for the resource pool and the PSFCH cycle 2, the feedback resource set, set, is divided into four subsets, for example, four subsets PSFCH1, PSFCH2, PSFCH3 and PSFCH4 in the PSFCH feedback slot as shown in FIG. 6. The subsets are determined based on the first minimum feedback delay K(1)=1, each corresponding to a slot position and a frequency domain subchannel position within the corresponding slot.

For each subset obtained from the division, the subset is divided into three sub-subsets according to the number, two, of the minimum feedback delays, namely sub-subset1, sub-subset2 and sub-subset3. As shown in FIG. 7, these three sub-subsets are in one-to-one mapping correspondence to the three minimum feedback delays. For PSSCH1 transport in the slot n, the correspondence is as follows.

K(1)=1 corresponds to the slot n+1 and corresponds to a fifth set 1, K(2)=3 corresponds to the slot n+3, and corresponds to a fifth set 2, K(3)=5 corresponds to the slot n+5, and corresponds to a fifth set 3.

The target feedback resource in each of the PSFCH feedback slots is determined according to a source ID of a transmitting UE, a member ID of a receiving UE and the number of frequency domain code domain resource elements in the fifth set 1 together. As shown in FIG. 7, the determined feedback resource 2 in the fifth set 1 in the PSFCH feedback slot n+1 is determined as the final target feedback resource corresponding to the PSSCH1. The target feedback resource corresponds to an RB position or an interleaved position in the frequency domain, and a cyclic shift value in the code domain.

After the target feedback resource is determined, the receiving UE performs feedback PSSCH1 on the feedback resource 2 in the PSFCH1 sub-subset (i.e., the fifth set 1) in a feedback resource set in the slot n+1, performs feedback PSSCH1 on the feedback resource 2 in the PSFCH1 sub-subset (i.e., the fifth set 2) in a feedback resource set in the slot n+3, and performs feedback PSSCH1 on the feedback resource 2 in the PSFCH1 sub-subset (i.e., the fifth set 3) in a feedback resource set in the slot n+5 as follows.

When data of the PSSCH1 is not received by the receiving UE, no feedback is performed; when data of the PSSCH1 is correctly received by the receiving UE, valid ACK information is fed back; and when data of the PSSCH1 is not correctly received by the receiving UE, valid NACK information is fed back.

Embodiment 4

For a resource pool configuration, it is assumed that the PSFCH cycle N=2, the number of subchannels is 2, three minimum feedback delays, K={1,3,5}, are configured, only one TB is transported on one time-frequency resource, and CBG feedback is not enabled.

Example 1

In each PSFCH feedback slot, one PSFCH feedback resource set, set, is configured, and according to the number, two, of subchannels configured for the resource pool and the PSFCH cycle 2, the feedback resource set, set, is divided into four subsets subset, for example, four subsets PSFCH1, PSFCH2, PSFCH3 and PSFCH4 in the feedback slot as shown in FIG. 9. The subsets are determined based on the first minimum feedback delay K(1), each corresponding to a counterpart slot position and a frequency domain subchannel position within the slot, for example, among the detected channels that can correspond to the PSFCH1, the detected channel closest to the PSFCH1 is PSSCH1, and the minimum feedback delay based on which the PSSCH1 corresponds to the PSFCH1 is K(1), therefore, the PSFCH1 has the same frequency domain position as that of the PSSCH1; and among the detected channels that can correspond to the PSFCH2, the detected channel closest to the PSFCH2 is PSSCH3, and the minimum feedback delay based on which the PSSCH3 corresponds to the PSFCH2 is K(1), therefore, the PSFCH2 has the same frequency domain position as that of the PSSCH3.

Within a subset, a final target feedback resource is determined based on a source ID of a transmitting UE, a member ID of a receiving UE and the number of feedback resources in the subset. As shown in FIG. 8, the target feedback resource corresponding to the PSSCH1 transport is the feedback resource 2 within the PSFCH1 (i.e., the sixth target set).

Figure 11:
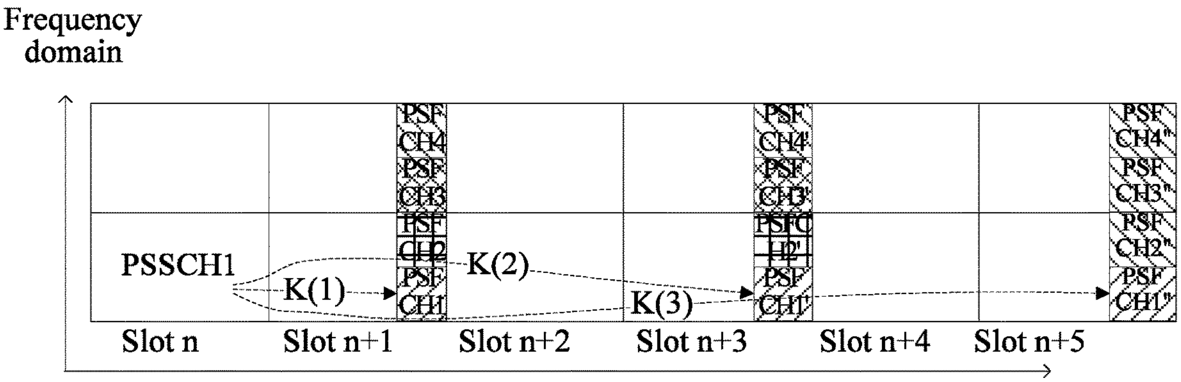
FIG. 11 is a schematic diagram showing that a frequency domain position of a target feedback resources in each of the feedback slots are the same according to an embodiment.

FIG. 11 is a schematic diagram showing that frequency domain positions of target feedback resources in each of the feedback slots are the same according to an embodiment. As shown in FIG. 11, according to a configured minimum feedback delay set, feedback slots of the PSSCH1 are slot n+1, slot n+3, and slot n+5, and the frequency domain positions of the feedback resources in all the slots are the same.

Three OCCs, OCC1, OCC2, and OCC3, are configured in the resource pool according to the number of minimum feedback delays k=3; these three OCCs are in one-to-one mapping correspondence to the minimum feedback delays. According to the configuration of the minimum feedback delay set, the target feedback resources corresponding to the PSSCH1 in slot n are: in the case of K(1)=1 corresponding to the slot n+1 and corresponding to the subset (i.e., the sixth target set) PSFCH1, the feedback resource 2 corresponding to the OCC1; in the case of K(2)=3 corresponding to the slot n+3 and corresponding to the subset (i.e., the sixth target set) PSFCH1, the feedback resource 2 corresponding to the OCC2; and in the case of K(3)=5 corresponding to the slot n+5 and corresponding to the subset (i.e., the sixth target set) PSFCH1, the feedback resource 2 corresponding to the OCC3, respectively.

In this embodiment, only one TB can be transported on one resource, CBG and CBG-based HARQ feedbacks are not enabled, and the receiving UE generates three bits of data on the feedback resource 2 within the PSFCH1 in the slot n+1. The details are as follows.

When the receiving UE does not receive data of the PSSCH1, the receiving UE performs no feedback on the target feedback resources corresponding to the slot n+1, slot n+3, and slot n+5; when the receiving UE receives PSSCH1 and what received is correct, the receiving UE performs feedback 001 on the feedback resource 2 in the slot n+1, and uses OCC1 after spread spectrum is performed on the feedback data; performs feedback 010 on the feedback resource 2 in the slot n+3, and uses OCC2 after spread spectrum is performed on the feedback data; and performs feedback 100 on the feedback resource 2 in the slot n+5, and uses OCC3 after spread spectrum is performed on the feedback data. Specifically, the position of "1" is related to an index of a minimum feedback delay based on which the PSSCH1 corresponds to the feedback slot. For example, when "1" is the first left bit in the three bits of feedback information, it indicates that in the feedback slot slot n+5 corresponding to the longest minimum feedback delay K(3), valid ACK information is fed back on the data of the detected channel.

When the receiving UE receives PSSCH1 but what received is incorrect, the receiving UE performs feedback 000 on the feedback resource 2 in the slot n+1, and uses OCC1 after spread spectrum is performed on the feedback data; performs feedback 000 on the feedback resource 2 in the slot n+3, and uses OCC2 after spread spectrum is performed on the feedback data; and performs feedback 000 on the feedback resource 2 in the slot n+5, and uses OCC3 after spread spectrum is performed on the feedback data. Only one bit "O" in each piece of feedback information denotes valid NACK information, and 0 in other bits are padded with NACK information. The position of the valid NACK information is related to an index of a minimum feedback delay based on which the PSSCH1 corresponds to the feedback slot. For example, when the valid NACK information is the first left bit in the three bits of feedback information, it indicates that in the feedback slot slot n+5 corresponding to the maximum (longest) minimum feedback delay K(3), valid NACK information is fed back on the data of the detected channel.

In the above feedback information, 1 denotes ACK information and 0 denotes NACK information.

Example 2

In each PSFCH feedback slot, one PSFCH feedback resource set set is configured, and then according to the number, two, of subchannels configured for the resource pool and the PSFCH cycle 2, the feedback resource set set is divided into four subsets subset, for example, four subsets PSFCH1, PSFCH2, PSFCH3 and PSFCH4 in the feedback slot as shown in FIG. 9. The subsets are determined based on the first minimum feedback delay K(1), each corresponding to a counterpart slot position and a frequency domain subchannel position within the slot.

Within the subset, a final target feedback resource is determined based on a source ID of a transmitting UE, a member ID of a receiving UE and the number of feedback resources in the subset. As shown in FIG. 8, the feedback resource corresponding to the PSSCH1 transport is the feedback resource 2 within the PSFCH1 in the feedback slot.

Figure 12:
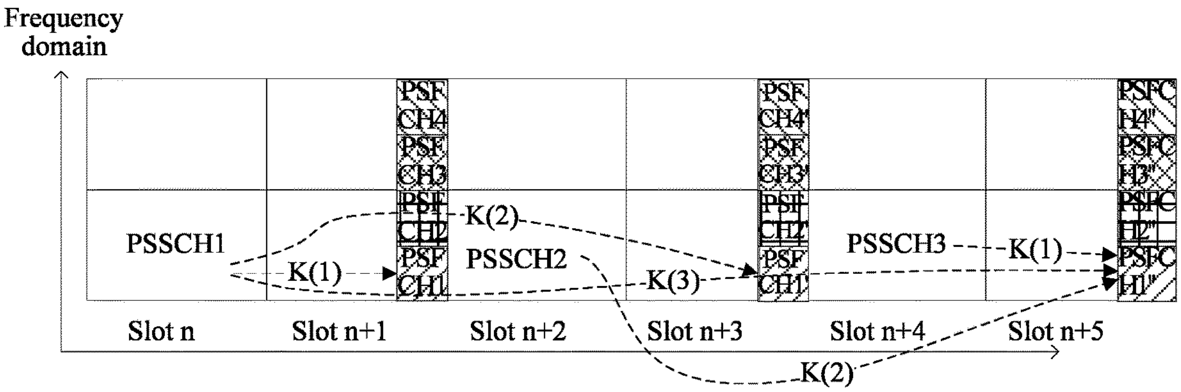
FIG. 12 is a schematic diagram showing the correspondence between detected channels and target feedback resources according to an embodiment.

FIG. 12 is a schematic diagram showing the correspondence between detected channels and target feedback resources according to an embodiment. As shown in FIG. 12, according to the number of the minimum feedback delays k configured, assuming k=3, three time domain feedback slots can be determined based on each PSSCH transport, and inferring inversely according to this relationship, the target feedback resource in each PSFCH feedback slot corresponds to three PSSCH transport resources.

There is a case where data transport occurred on all of the PSSCH1 in slot n, the PSSCH2 in slot n+2 and the PSSCH4 in slot n+4, thus the target feedback resources corresponding to the PSSCH1 based on the feedback delay K(3), corresponding to the PSSCH2 based on the feedback delay K(2) and corresponding to the PSSCH3 based on the feedback delay K(1) all correspond to the same feedback resource in the slot n+5, and it is assumed that this resource is the feedback resource 2 in the PSFCH1 resource set.

For the description in the example 1, the receiving UE generates three bits of feedback data for each PSSCH transport. However, the position of the valid feedback bit corresponding to each PSSCH transport in the three bits is related to the feedback delay, and the positions are different from each other. Therefore, when UE1 sends data on the PSSCH1, PSSCH2, and PSSCH3, respectively, the receiving UE can merge the valid bits in the feedback bits corresponding to the three PSSCHs. The merging process includes as follows.

When data of none of the PSSCH1, the PSSCH2, and the PSSCH3 are received by the receiving UE, the receiving UE does not feed back data in the slot n+5; when data of the PSSCH1 is received correctly by the receiving UE, data of the PSSCH2 is received correctly by the receiving UE, and data of the PSSCH3 is received correctly by the receiving UE, the receiving UE performs feedback 111 on the feedback resource 2 in the slot n+5, and OCC1 corresponding to the feedback slot K(1) corresponding to the fixed PSSCH3 is used for the OCC. The first left bit corresponds to the feedback on the PSSCH1 and K(3), the middle bit corresponds to the feedback on the PSSCH2 and K(2), and the rightmost bit corresponds to the feedback on the PSSCH3 and K(1). The 111 herein can be understood as the result of combination of the feedback 100 corresponding to the PSSCH1, the feedback 010 corresponding to the PSSCH2 and the feedback 001 corresponding to the PSSCH3 in the example 1.

When data of the PSSCH1 is received correctly by the receiving UE, data of the PSSCH2 is not received by the receiving UE and data of the PSSCH3 is received correctly by the receiving UE, the receiving UE performs feedback 101 on the feedback resource 2 in the slot n+5, and also, OCC1 corresponding to the feedback slot K(1) corresponding to the fixed PSSCH3 is used for the OCC. The first left bit corresponds to the feedback on the PSSCH1 and K(3), the middle bit corresponds to the feedback on the PSSCH2 and K(2), and the rightmost bit corresponds to the feedback on the PSSCH3 and K(1). When data of the PSSCH1 is received incorrectly by the receiving UE, data of PSSCH2 is not received by the receiving UE and data of PSSCH3 is received correctly by the receiving UE, the receiving UE performs feedback 001 on the feedback resource 2 in the slot n+5, and also, OCC1 corresponding to the feedback slot K(1) corresponding to the fixed PSSCH3 is used for the OCC. Specifically, the first left bit corresponds to the feedback on the PSSCH1 and K(3), the middle bit corresponds to the feedback on the PSSCH2 and K(2), and the rightmost bit corresponds to the feedback on the PSSCH3 and K(1).

Example 3

The difference of the example 3 from the example 2 lies in that the PSSCH1, the PSSCH2 and the PSSCH3 come from different transmitting UEs, for example, UE1 transmits PSSCH1 and PSSCH2, UE2 transmits PSSCH3, and the PSSCH1, PSSCH2 and PSSCH3 are all transmitted to the same receiving UE3.

When the UE3 performs feedback on the target feedback resource 2 in the slot n+5, and multiple data are received, it is also required to merge the data. The merging process includes as follows.

When data of the PSSCH1, PSSCH2, and PSSCH3 are not received by the receiving UE, the receiving UE does not feedback data on the slot n+5; when data of the PSSCH1, PSSCH2, and PSSCH3 are all received correctly by the receiving UE, the receiving UE generates 100 for the PSSCH1 as described in the example 1, generates 010 for the PSSCH2 as described in the example 1, and generates 001 for the PSSCH3 as described in the example 1. The feedback data combined by the receiving UE is 111, but it is required to take a predefined, preconfigured or configured value in this case for the OCC. For example, 1 is taken for the value of OCC. If data of the PSSCH1, PSSCH2 are received correctly by the receiving UE and data of the PSSCH3 is not received by the receiving UE, the receiving UE generates 100 for the PSSCH1 as described in the example 1, and generates 010 for the PSSCH2 as described in the example 1, and the receiving UE does not provide effective feedback for the PSSCH3 since the PSSCH3 is not received by the receiving UE. In this case, according to the NACK information processing, the receiving UE merges the feedback data on the PSSCH1 and the PSSCH2 to obtain a merged data 110. Since from the perspective of the receiving UE, only the data transmitted from one UE is received, which is the same as that in the example 2, OCC2 corresponding to the feedback slot K(2) corresponding to the PSSCH2 is used for the OCC in this case, and apparently, from the perspectives of both the sending ends UE1 and UE2, this is an abnormal feedback, since OCC does not take the predefined, preconfigured or configured value, it indicates that some PSSCH data sent by some transmitting UE is not correctly received by the receiving UE.

Figure 13:
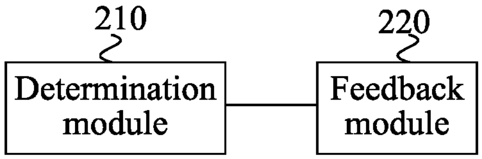
FIG. 13 is a schematic structural diagram of a feedback apparatus according to an embodiment.

A feedback apparatus is further provided according to an embodiment of the present application. FIG. 13 is a schematic structural diagram of a feedback apparatus according to an embodiment. As shown in FIG. 13, the feedback apparatus includes: a determination module 210 and a feedback module 220.

The determination module 210 is configured to determine at least two feedback slots corresponding to a detect channel of at least one detected channel, and determine a feedback resource set contained in each of the at least two feedback slots; and the feedback module 220 is configured to sending feedback information for the detected channel through a target feedback resource in the feedback resource set in one or more of the at least two feedback slots.

The feedback apparatus according to this embodiment can use multiple feedback slots to provide multiple feedback occasions for the detected channel, to enable HARQ feedback information to be fed back to the sending end with a higher probability, thus reducing the effect on SL HARQ feedback caused by performing the LBT mechanism on the unlicensed frequency band, thereby improving communication efficiency and reliability.

In an embodiment, the determination module 210 includes: a slot determination unit.

The slot determination unit is configured to determine the at least two feedback slots based on at least two minimum feedback delays, where the at least two minimum feedback delays are in one-to-one mapping correspondence to the at least two feedback slots.

In an embodiment, a feedback slot, among the at least two feedback slots, corresponding to a respective one of the at least two minimum feedback delays is: a first one of slots containing feedback resource, and where an interval between each of the slots containing feedback resource and a slot in which the detected channel is located is greater than or equal to the respective one of the at least two minimum feedback delays.

In an embodiment, the at least two minimum feedback delays are determined according to one of: a configured value of each of the at least two minimum feedback delays; one of the at least two minimum feedback delays, the number of the at least two minimum feedback delays, and a feedback channel cycle; one of the at least two minimum feedback delays, the number of the at least two minimum feedback delays and a set time interval; and one of the at least two minimum feedback delays and a feedback delay offset set.

In an embodiment, each of the at least two feedback slots contains at least two feedback resource sets, and a number of the at least two feedback resource sets is the same as a number of the at least two minimum feedback delays; and for each of the at least two feedback slots, a target feedback resource set contained in each of the at least two feedback slots corresponding to the detected channel, is determined according to an index of a minimum feedback delay, among the at least two minimum feedback delays, corresponding to each of the at least two feedback slots; and the target feedback resource belongs to the target feedback resource set.

In an embodiment, the target feedback resource set includes at least one first set; and the apparatus further includes a first determination unit. The first determination unit is configured to, for each of the at least two feedback slots, determine, according to an index of a time-frequency position of the detected channel, a first target set, contained in each of the at least two feedback slots corresponding to the detected channel, in the target feedback resource set, and determine the target feedback resource in the first target set.

In an embodiment, each of the at least two feedback slots contains one feedback resource set, and the one feedback resource set includes at least two second sets. For each of the at least two feedback slots, a second target set, contained in each of the at least two feedback slots corresponding to the detected channel, is determined according to an index of each of the at least two minimum feedback delays corresponding to each of the at least two feedback slots; and the target feedback resource belongs to the second target set.

In an embodiment, the second target set includes at least one third set. The apparatus further includes a second determination unit. The second determination unit is configured to, for each of the at least two feedback slots, determine, according to an index of a time-frequency position of the detected channel, a third target set, contained in each of the at least two feedback slots corresponding to the detected channel, in the second target set, and determine the target feedback resource in the third target set.

In an embodiment, each of the at least two feedback slots contains one feedback resource set, and the one feedback resource set includes at least one fourth set. For each of the at least two feedback slots, a fourth target set, contained in each of the at least two feedback slots corresponding to the detected channel, is determined according to an index of a time-frequency position of the detected channel, and the target feedback resource belongs to the fourth target set.

In an embodiment, the fourth target set includes at least two fifth sets; and the apparatus further includes a third determination unit. The third determination unit is configured to, for each of the at least two feedback slots, determine, according to an index of each of the at least two minimum feedback delays corresponding to each of the at least two feedback slots, a fifth target set, contained in each of the at least two feedback slots corresponding to the detected channel, in the fourth target set, and determine the target feedback resource in the fifth target set.

In an embodiment, the feedback module 220 is configured to sending L bits of the feedback information for the detected channel through the target feedback resource in the feedback resource set in one or more of the at least two feedback slots, wherein L is determined based on a number of transport blocks supported for transport on a time-frequency resource and a number of code blocks supported for transport when code block group feedback is enabled, and L is greater than or equal to 1.

In an embodiment, each of the at least two feedback slots contains one feedback resource set, and the one feedback resource set includes at least one sixth set; each of the at least two feedback slots contains a same sixth target set among the at least one sixth set. The apparatus further includes a fourth determination unit. The fourth determination unit is configured to, for each of the at least two feedback slots, determine the target feedback resource according to an index of a time-frequency position of the detected channel in the same sixth target set.

In an embodiment, for each of the at least two feedback slots, an orthogonal cover code (OCC) corresponding to the target feedback resource in the same sixth target set is determined according to an index of each of the at least two minimum feedback delays corresponding to each of the at least two feedback slots.

In an embodiment, for each of the at least two feedback slots, spread spectrum is performed on the feedback information sent through the target feedback resource contained in each of the at least two feedback slots, and the feedback information with spread spectrum is multiplied by an OCC corresponding to an index of one of the at least two minimum feedback delays corresponding to each of the at least two feedback slots.

In an embodiment, the feedback module 220 is configured to, send k groups of the feedback information of L bits in total through the target feedback resource in the feedback resource set, where k is a number of minimum feedback delays, and L is determined based on a number of transport blocks supported for transport on the time-frequency resource, a number of code blocks supported for transport when code block group feedback is enabled and the number of minimum feedback delays.

In an embodiment, the apparatus further includes a generation module. The generation module is configured to perform the following:

- in response to that data of the detected channel is correctly received, generating the k groups of feedback information on the target feedback resource in the one of the at least two feedback slots, where the k groups of feedback information comprises one group of feedback information being valid acknowledgment information, and remaining k−1 groups of feedback information being padded negative-acknowledgment information, and where a position of the valid acknowledgment information in the k groups of feedback information is determined according to an index of the one of the at least two minimum feedback delays corresponding to the detected channel and the target feedback resource;
- in response to that data of the detected channel is not correctly received, generating the k groups of feedback information on the target feedback resource in the one of the at least two feedback slots, where the k groups of feedback information comprises one group of feedback information being valid negative-acknowledgment information, and remaining k−1 groups of feedback information being padded negative-acknowledgment information, and where a position of the valid negative-acknowledgment information in the k groups of feedback information is determined according to an index of the one of the at least two minimum feedback delays corresponding to the detected channel and the target feedback resource; and
- in response to that data of the detected channel is not received or data of a control channel associated with the detected channel is not correctly received, not generating the k groups of feedback information.

In an embodiment, the apparatus further includes a merging module. The merging module is configured to perform, in response to that time-frequency positions of target feedback resources respectively corresponding to P detected channels of the at least one detected channel are the same, merging feedback information corresponding to each of the P detected channels.

The merging the feedback information corresponding to each of the P detected channels includes: according to indices of minimum feedback delays of the at least two minimum feedback delays corresponding to the P detected channels and the target feedback resources, padding valid acknowledgment information or valid negative-acknowledgment information in the k groups of feedback information corresponding to each of the P detected channels into p respective groups in the k groups of feedback information, wherein remaining k-p groups of feedback information in the k groups of feedback information is padded with negative-acknowledgment information, to obtain merged feedback information.

In an embodiment, in response to that the P detected channels comprise channels from different sending ends, an OCC corresponding to the merged feedback information takes a predefined value, a preconfigured value or a configured value; and in response to that the P detected channels are channels from a same sending end, an OCC of the merged feedback information takes an OCC corresponding to one of the at least two minimum feedback delays corresponding to a detected channel, located at a predetermined position, a preconfigured position or a configured position, of the P detected channels and the target feedback resources.

In an embodiment, the feedback module 220 is configured to, for each of the at least one detected channel, sending the feedback information for each of the at least one detected channel through the target feedback resource in the feedback resource set in one or more of the at least two feedback slots corresponding to each of the at least one detected channel.

The feedback device proposed in this embodiment has the same concept as the feedback method proposed in the above embodiment. Technical details not described in detail in this embodiment can be found in any of the above embodiments, and this embodiment has the same effect as the implementation of the feedback method.

An embodiment of the present application also provides a communication node. The feedback method may be executed by a feedback apparatus, which may be implemented in software and/or hardware and integrated in the communication node. The communication node is a receiving end in side link communication, such as a receiving UE. The communication node includes but is not limited to: a desktop computer, a laptop, a smartphone, a tablet, or the like.

Figure 14:
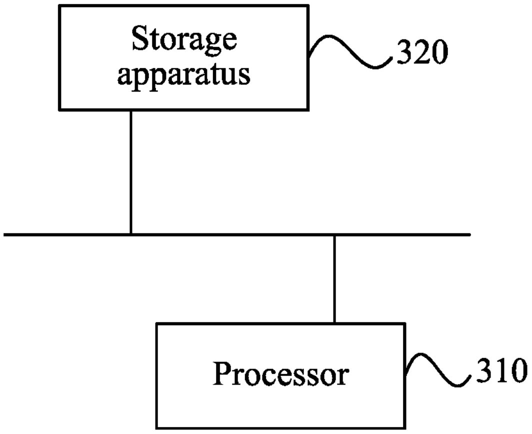
FIG. 14 is a hardware structural schematic diagram of a communication node according to an embodiment.

FIG. 14 is a hardware structural schematic diagram of a communication node according to an embodiment of the present application. As shown in FIG. 14, a communication node according to this embodiment includes: a processor 310 and a memory 320. One or more processors may be provided in the communication node, and one processor 310 is taken as an example in FIG. 14. The processor 310 and the memory 320 in the device may be connected by a bus or in other ways, and the connection by a bus is taken as an example in FIG. 14.

The one or more programs are executed by the one or more processors 310, so that the one or more processors implement the feedback method described in any of the above embodiments.

The memory 320 in the communication node serves as a computer-readable storage medium and can be configured to store one or more programs. The one or more programs can be a software program, a computer executable program and a module. For example, program instructions/modules corresponding to the feedback method in the embodiments of the present application (for example, the modules in the feedback apparatus shown in FIG. 13, including: the determination module 210 and the feedback module 220). The processor 310 executes various functional applications and data processing of the communication node by running software programs, instructions and modules stored in the memory 320, thereby implementing the feedback method in the above method embodiment.

The memory 320 mainly include a program storage region and a data storage region, the program storage region may store an operating system and at least one application program required by functions, the data storage region may store data created during utilization of the device, and etc. (for example, the feedback information in the above embodiments). In addition, the memory 320 may include a high-speed random access memory, and may further include a non-volatile memory, such as at least one magnetic disk storage apparatus, a flash memory device, or other non-volatile solid-state storage apparatus. In some examples, the memory 320 may include memories which are remotely provided with respect to the processor(s) 310, and these remote memories may be connected to the communication node through a network. Examples of the aforementioned network include, but are not limited to, the Internet, an intranet, a local area network, a mobile communication network, or any combination thereof.

Moreover, when one or more programs included in the communication node are executed by the one or more processors 310, the following operations are implemented:

determining at least two feedback slots corresponding to a detect channel of at least one detected channel, and determining a feedback resource set contained in each of the at least two feedback slots; and sending feedback information for the detected channel through a target feedback resource in the feedback resource set in one or more of the at least two feedback slots.

The communication node provided in this embodiment has the same concept as the feedback method provided in the above embodiments. For technical details not described in detail in this embodiment, reference can be made in any of the above embodiments, and this embodiment has the same effect as the implementation of the feedback method.

A storage medium including computer-executable instructions is further provided according to an embodiment of the present application, the computer-executable instructions are configured to perform the feedback method when executed by a computer processor.

From the above description of the embodiment, the person skilled in the art can understand that the present application can be implemented by means of software and general hardware, or can also be implemented with hardware. Based on this understanding, the technical solution of the present application can be embodied in the form of a software product. The computer software product can be stored in a computer-readable storage medium, such as a computer floppy disk, a read-only memory (ROM), a random access memory (RAM), a flash memory (FLASH), a hard disk or an optical disk, etc., including multiple instructions to cause a computer device (which can be a personal computer, server, or network device, etc.) to execute the method according to any embodiment of the present application.

The above are only exemplary embodiments of the present application.

The block diagrams of any logic flow in drawings of the present disclosure may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disc (DVD) or compact disc (CD)). The computer-readable storage medium may include a non-transitory storage medium. The data processor may be of any type appropriate for the local technical environment such as, but not limited to, a general-purpose computer, a special purpose computer, a microprocessor, a digital signal processor (DSP), an application specific integrated circuit (ASIC), a field-programmable gate array (FPGA), or a processor based on a multi-core processor architecture.

What is claimed is:

1. A feedback method, comprising:

determining at least two feedback slots corresponding to a detect channel of at least one detected channel, and determining a feedback resource set contained in each of the at least two feedback slots; and sending feedback information for the detected channel through a target feedback resource in the feedback resource set in one or more of the at least two feedback slots, wherein determining the at least two feedback slots corresponding to the detected channel comprises:

determining the at least two feedback slots based on at least two minimum feedback delays, wherein the at least two minimum feedback delays are in one-to-one mapping correspondence to the at least two feedback slots.

2. The feedback method according to claim 1, wherein a feedback slot, among the at least two feedback slots, corresponding to a respective one of the at least two minimum feedback delays is: a first one of slots containing feedback resource, and wherein an interval between each of the slots containing feedback resource and a slot in which the detected channel is located is greater than or equal to the respective one of the at least two minimum feedback delays.

3. The feedback method according to claim 1, wherein the at least two minimum feedback delays are determined according to one of:

a configured value of each of the at least two minimum feedback delays;

one of the at least two minimum feedback delays, a number of the at least two minimum feedback delays and a feedback channel cycle;

one of the at least two minimum feedback delays, a number of the at least two minimum feedback delays and a set time interval; or, one of the at least two minimum feedback delays and a feedback delay offset set.

4. The feedback method according to claim 1, wherein each of the at least two feedback slots contains at least two feedback resource sets, and a number of the at least two feedback resource sets is the same as a number of the at least two minimum feedback delays; and for each of the at least two feedback slots, a target feedback resource set contained in each of the at least two feedback slots corresponding to the detected channel, is determined according to an index of a minimum feedback delay, among the at least two minimum feedback delays, corresponding to each of the at least two feedback slots; and the target feedback resource belongs to the target feedback resource set;

or, wherein each of the at least two feedback slots contains one feedback resource set, and the one feedback resource set comprises at least two second sets; and for each of the at least two feedback slots, a second target set, contained in each of the at least two feedback slots corresponding to the detected channel, is determined according to an index of each of the at least two minimum feedback delays corresponding to each of the at least two feedback slots; and the target feedback resource belongs to the second target set, or, wherein each of the at least two feedback slots contains one feedback resource set, and the one feedback resource set comprises at least one fourth set; and for each of the at least two feedback slots, a fourth target set, contained in each of the at least two feedback slots corresponding to the detected channel, is determined according to an index of a time-frequency position of the detected channel, and the target feedback resource belongs to the fourth target set.

5. The feedback method according to claim 4, wherein the target feedback resource set comprises at least one first set; and wherein the feedback method further comprises:

for each of the at least two feedback slots, determining, according to an index of a time-frequency position of the detected channel, a first target set, contained in each of the at least two feedback slots corresponding to the detected channel, in the target feedback resource set, and determining the target feedback resource in the first target set.

6. The feedback method according to claim 4, wherein the second target set comprises at least one third set; and wherein the feedback method further comprises:

for each of the at least two feedback slots, determining, according to an index of a time-frequency position of the detected channel, a third target set, contained in each of the at least two feedback slots corresponding to the detected channel, in the second target set, and determining the target feedback resource in the third target set.

7. The feedback method according to claim 4, wherein the fourth target set comprises at least two fifth sets; and wherein the feedback method further comprises:

for each of the at least two feedback slots, determining, according to an index of each of the at least two minimum feedback delays corresponding to each of the at least two feedback slots, a fifth target set, contained in each of the at least two feedback slots corresponding to the detected channel, in the fourth target set, and determining the target feedback resource in the fifth target set.

8. The feedback method according to claim 4, wherein sending the feedback information for the detected channel through the target feedback resource in the feedback resource set in one or more of the at least two feedback slots comprises:

sending L bits of the feedback information for the detected channel through the target feedback resource in the feedback resource set in one or more of the at least two feedback slots, wherein L is determined based on a number of transport blocks supported for transport on a time-frequency resource and a number of code blocks supported for transport when code block group feedback is enabled, and L is greater than or equal to 1.

9. The feedback method according to claim 1, wherein each of the at least two feedback slots contains one feedback resource set, and the one feedback resource set comprises at least one sixth set; each of the at least two feedback slots contains a same sixth target set among the at least one sixth set; and wherein the feedback method further comprises:

for each of the at least two feedback slots, determining the target feedback resource according to an index of a time-frequency position of the detected channel in the same sixth target set.

10. The feedback method according to claim 9, wherein for each of the at least two feedback slots, an orthogonal cover code (OCC) corresponding to the target feedback resource in the same sixth target set is determined according to an index of each of the at least two minimum feedback delays corresponding to each of the at least two feedback slots.

11. The feedback method according to claim 10, wherein for each of the at least two feedback slots, spread spectrum is performed on the feedback information sent through the target feedback resource contained in each of the at least two feedback slots, and the feedback information with spread spectrum is multiplied by an OCC corresponding to an index of one of the at least two minimum feedback delays corresponding to each of the at least two feedback slots.

12. The feedback method according to claim 11, wherein sending the feedback information for the detected channel through the target feedback resource in the feedback resource set in one or more of the at least two feedback slots comprises:

sending k groups of the feedback information of L bits in total through the target feedback resource in the feedback resource set, wherein k is a number of minimum feedback delays, and L is determined based on a number of transport blocks supported for transport on a time-frequency resource, a number of code blocks supported for transport when code block group feedback is enabled and the number of minimum feedback delays.

13. The feedback method according to claim 12, further comprising:

in response to that data of the detected channel is correctly received, generating the k groups of feedback information on the target feedback resource in the one of the at least two feedback slots, wherein the k groups of feedback information comprises one group of feedback information being valid acknowledgment information, and remaining k−1 groups of feedback information being padded negative-acknowledgment information, and wherein a position of the valid acknowledgment information in the k groups of feedback information is determined according to an index of the one of the at least two minimum feedback delays corresponding to the detected channel and the target feedback resource;

in response to that data of the detected channel is not correctly received, generating the k groups of feedback information on the target feedback resource in the one of the at least two feedback slots, wherein the k groups of feedback information comprises one group of feedback information being valid negative-acknowledgment information, and remaining k−1 groups of feedback information being padded negative-acknowledgment information, and wherein a position of the valid negative-acknowledgment information in the k groups of feedback information is determined according to an index of the one of the at least two minimum feedback delays corresponding to the detected channel and the target feedback resource; and in response to that data of the detected channel is not received or data of a control channel associated with the detected channel is not correctly received, not generating the k groups of feedback information.

14. The feedback method according to claim 13, further comprising:

in response to that time-frequency positions of target feedback resources respectively corresponding to P detected channels of the at least one detected channel are the same, merging feedback information corresponding to each of the P detected channels; wherein the merging the feedback information corresponding to each of the P detected channels comprises:

according to indices of minimum feedback delays of the at least two minimum feedback delays corresponding to the P detected channels and the target feedback resources, padding valid acknowledgment information or valid negative-acknowledgment information in the k groups of feedback information corresponding to each of the P detected channels into p respective groups in the k groups of feedback information, wherein remaining k-p groups of feedback information in the k groups of feedback information is padded with negative-acknowledgment information, to obtain merged feedback information.

15. The feedback method according to claim 14, wherein in response to that the P detected channels comprise channels from different sending ends, an OCC corresponding to the merged feedback information takes a predefined value, a preconfigured value or a configured value; and in response to that the P detected channels are channels from a same sending end, an OCC of the merged feedback information takes an OCC corresponding to one of the at least two minimum feedback delays corresponding to a detected channel, located at a predetermined position, a preconfigured position or a configured position, of the P detected channels and the target feedback resources.

16. A communication node, comprising a memory, a processor, and a computer program stored in the memory and executable by the processor, wherein the processor, when executing the computer program, implements:

determining at least two feedback slots corresponding to a detect channel of at least one detected channel, and determining a feedback resource set contained in each of the at least two feedback slots; and sending feedback information for the detected channel through a target feedback resource in the feedback resource set in one or more of the at least two feedback slots, wherein determining the at least two feedback slots corresponding to the detected channel comprises:

determining the at least two feedback slots based on at least two minimum feedback delays, wherein the at least two minimum feedback delays are in one-to-one mapping correspondence to the at least two feedback slots.

17. The communication node according to claim 16, wherein a feedback slot, among the at least two feedback slots, corresponding to a respective one of the at least two minimum feedback delays is: a first one of slots containing feedback resource, and wherein an interval between each of the slots containing feedback resource and a slot in which the detected channel is located is greater than or equal to the respective one of the at least two minimum feedback delays.

18. The communication node according to claim 16, wherein each of the at least two feedback slots contains at least two feedback resource sets, and a number of the at least two feedback resource sets is the same as a number of the at least two minimum feedback delays; and for each of the at least two feedback slots, a target feedback resource set contained in each of the at least two feedback slots corresponding to the detected channel, is determined according to an index of a minimum feedback delay, among the at least two minimum feedback delays, corresponding to each of the at least two feedback slots; and the target feedback resource belongs to the target feedback resource set;

or, wherein each of the at least two feedback slots contains one feedback resource set, and the one feedback resource set comprises at least two second sets; and for each of the at least two feedback slots, a second target set, contained in each of the at least two feedback slots corresponding to the detected channel, is determined according to an index of each of the at least two minimum feedback delays corresponding to each of the at least two feedback slots; and the target feedback resource belongs to the second target set, or, wherein each of the at least two feedback slots contains one feedback resource set, and the one feedback resource set comprises at least one fourth set; and for each of the at least two feedback slots, a fourth target set, contained in each of the at least two feedback slots corresponding to the detected channel, is determined according to an index of a time-frequency position of the detected channel, and the target feedback resource belongs to the fourth target set.

19. The communication node according to claim 16, wherein each of the at least two feedback slots contains one feedback resource set, and the one feedback resource set comprises at least one sixth set; each of the at least two feedback slots contains a same sixth target set among the at least one sixth set; and wherein the processor, when executing the computer program, further implements:

for each of the at least two feedback slots, determining the target feedback resource according to an index of a time-frequency position of the detected channel in the same sixth target set.

20. A non-transitory computer-readable storage medium, storing a computer program, wherein the computer program, when being executed by a processor, implements:

determining at least two feedback slots corresponding to a detect channel of at least one detected channel, and determining a feedback resource set contained in each of the at least two feedback slots; and sending feedback information for the detected channel through a target feedback resource in the feedback resource set in one or more of the at least two feedback slots, wherein determining the at least two feedback slots corresponding to the detected channel comprises:

determining the at least two feedback slots based on at least two minimum feedback delays, wherein the at least two minimum feedback delays are in one-to-one mapping correspondence to the at least two feedback slots.

* * * * *